US012732415B2

(12) United States Patent
Khalid et al.

(10) Patent No.: US 12,732,415 B2
(45) **Date of Patent: *Sep. 8, 2026**

(54) METHODS AND APPARATUS FOR DETECTING AND AUTOMATICALLY CORRECTING RADIO PARAMETER SETTINGS IN CELLS OF A COMMUNICATIONS NETWORK

(71) Applicant: Charter Communications Operating, LLC, St. Louis, MO (US)

(72) Inventors: Saran Khalid, Denver, CO (US); Syed M. Abid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/019,339

(22) Filed: Jan. 13, 2025

(65) Prior Publication Data

US 2025/0150331 A1 May 8, 2025

Related U.S. Application Data

(63) Continuation of application No. 18/350,489, filed on Jul. 11, 2023, now Pat. No. 12,199,816.

(51) Int. Cl.

| | |
|---|---|
| ***H04L 41/0659*** | (2022.01) |
| ***H04L 41/0668*** | (2022.01) |
| ***H04W 36/00*** | (2009.01) |

(52) U.S. Cl.

CPC ...... *H04L 41/0659* (2013.01); *H04L 41/0668* (2013.01); *H04W 36/0079* (2018.08)

(58) Field of Classification Search

None

See application file for complete search history.

(56) References Cited

U.S. PATENT DOCUMENTS

| | | | | |
|---|---|---|---|---|
| 2012/0190359 | A1* | 7/2012 | Aminaka | H04W 24/02 455/422.1 |
| 2016/0007252 | A1* | 1/2016 | Larmo | H04W 76/28 370/332 |
| 2018/0103486 | A1* | 4/2018 | Madan | H04W 72/21 |
| 2019/0261234 | A1* | 8/2019 | Park | H04W 36/085 |
| 2023/0164647 | A1* | 5/2023 | Tao | H04W 36/083 370/331 |

* cited by examiner

*Primary Examiner* — Mohamed Ibrahim

(74) *Attorney, Agent, or Firm* — Straub & Straub; Michael P. Straub; Stephen T. Straub

(57) ABSTRACT

A Configuration Auditor and Configuration Enforcer (CACE) automatically runs audits of cells in a network and finds any discrepancies between the actual and preferred configuration. The CACE has access to lists of parameters and preferred settings for the network operator in which the cell being audited is located and thus knows the preferred settings for the given type of radio being audited and/or use of the radio in terms of the intended coverage area and/or traffic type being communicated. The list of parameters to which the actual radio settings is compared is sometimes referred to as a "golden parameter list". The detection of radio parameter setting discrepancies, e.g., setting errors, and the correction of the parameter settings is performed automatically with parameter settings being automatically corrected on the fly, e.g., immediately, when possible without disrupting service or during a scheduled service interval if a radio reboot is required.

20 Claims, 29 Drawing Sheets

| FIGURE 5A |
| --- |
| FIGURE 5B |

FIGURE 5

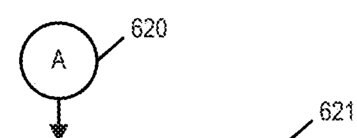

621

TAKE ACTION TO AUTOMATICALLY CORRECT ONE OR MORE IDENTIFIED RADIO SETTINGS WHICH DIFFER FROM THE CORRESPONDING SETTINGS INDICATED IN THE ACCESSED STORED FIRST TYPE RADIO CONFIGURATION INFORMATION

622

TAKE ACTION TO AUTOMATICALLY CORRECT ONE OR MORE IDENTIFIED RADIO SETTINGS WHICH DIFFER FROM THE CORRESPONDING SETTINGS INDICATED IN THE ACCESSED STORED FIRST TYPE RADIO CONFIGURATION INFORMATION AND WHICH, IF CHANGED WHILE SERVICE IS BEING PROVIDED BY THE FIRST CELL, WILL NOT HAVE A DISRUPTIVE IMPACT ON ONGOING SERVICE

624

PUSH AN IMMEDIATE RADIO PARAMETER SETTING UPDATE TO UPDATE ONE OR MORE IDENTIFIED RADIO SETTINGS TO MATCH CORRESPONDING RADIO SETTINGS INDICATED IN THE STORED FIRST TYPE RADIO CONFIGURATION INFORMATION

626

TAKE ACTION TO AUTOMATICALLY CORRECT ONE OR MORE IDENTIFIED RADIO SETTINGS WHICH DIFFER FROM THE CORRESPONDING SETTINGS INDICATED IN THE ACCESSED STORED FIRST TYPE RADIO CONFIGURATION INFORMATION AND WHICH, IF CHANGED WHILE SERVICE IS BEING PROVIDED BY THE FIRST CELL, WILL HAVE A DISRUPTIVE IMPACT ON ONGOING SERVICE

628

WAIT FOR A FIRST CELL MAINTENANCE WINDOW BEFORE UPDATING ONE OR MORE IDENTIFIED RADIO SETTINGS FOR THE FIRST CELL WHICH IF CHANGED WHILE SERVICE IS BEING PROVIDED BY THE FIRST CELL WOULD HAVE A DISRUPTIVE IMPACT ON AN ONGOING SERVICE AT THE FIRST CELL

630

PUSH, DURING A FIRST CELL MAINTENANCE WINDOW FOLLOWING IDENTIFICATION OF RADIO SETTINGS IN THE RETRIEVED FIRST CELL RADIO CONFIGURATION INFORMATION WHICH DIFFER FROM THE ACCESSED STORED FIRST TYPE RADIO CONFIGURATION INFORMATION, A RADIO PARAMETER SETTING UPDATE TO UPDATE ONE OR MORE IDENTIFIED RADIO SETTINGS, WHICH IF CHANGED DURING A SERVICE PERIOD OF THE FIRST CELL WOULD HAVE A DISRUPTIVE IMPACT ON SERVICE PROVIDED BY THE FIRST CELL, TO MATCH CORRESPONDING RADIO SETTINGS INDICATED IN THE STORED FIRST TYPE RADIO CONFIGURATION INFORMATION

FIGURE 6B

| FIGURE 6A |
| --- |
| FIGURE 6B |

FIGURE 6

| FIGURE 7A |
| --- |
| FIGURE 7B |

FIGURE 7

| FIGURE 8A |
| --- |
| FIGURE 8B |

| CACE AUDIT RESULTS SUMMARY (FOR AN EXEMPLARY gNB IN NETWORK OPERATOR 1's NETWORK) IDENTIFYING THE PARAMETERS WHICH REQUIRE UPDATING | | | | |
|---|---|---|---|---|
| PARAMETER NAME (1902) | PARAMETER DESCRIPTION (1904) | SERVICE IMPACT CLASSIFICATION (1906) | PARAMETER VALUE (CURRENTLY LOADED IN NETWORK OPERATOR 1 NETWORK'S gNB INCLUDING RADIO - RADIO TYPE 1) (1908) | NETWORK OPERATOR 1 RADIO TYPE 1 CUSTOMIZED GOLDEN PARAMETER LIST (GPL) VALUE (1910) |
| T-EVALUATION (1914) | THE DURATION FOR EVALUATING CRITERIA TO ENTER MOBILITY STATES | ON THE FLY | S120 (120 SECONDS) | S180 (180 SECONDS) |
| TIME TO TRIGGER (FOR EVENT A3) (1916) | TIME DURING WHICH SPECIFIC CRITERIA FOR A3 EVENT NEEDS TO BE MET IN ORDER TO TRIGGER A MEASUREMENT REPORT | ON THE FLY | 100 ms | 160 ms |
| POWER RAMPING STEP (1918) | THIS SPECIFIES THE POWER RAMPING STEPS | REBOOT REQUIRED | 2 dB | 0 dB |
| MAXIMUM NUMBER OF REFERENCE SIGNAL INDEXES TO REPORT (FOR EVENT A3) (1920) | MAX NUMBER OF RS INDEXES TO INCLUDE IN THE MEASUREMENT REPORT FOR A3 EVENT | REBOOT REQUIRED | 3 | 1 |

The header row is labelled 1912.

FIGURE 19

METHODS AND APPARATUS FOR DETECTING AND AUTOMATICALLY CORRECTING RADIO PARAMETER SETTINGS IN CELLS OF A COMMUNICATIONS NETWORK

RELATED APPLICATIONS

The present application is a continuation of U.S. patent application Ser. No. 18/350,489 filed on Jul. 11, 2023, which is hereby expressly incorporated by reference in its entirety.

FIELD

The present application relates to communications methods and apparatus, and more particularly, to methods and apparatus for detecting and automatically correcting radio parameter settings in cells of a communications network.

BACKGROUND

For most cellular network providers, the network provider's network includes a large number of radios. These heterogeneous networks are usually mixed in nature and include different types of cells and different types of radios, depending on the use case. For example, a network may include a combination of small cells, macro cells, and pico cells, e.g., with different types of radios corresponding to the different types of cells.

Different radios in a network, e.g., in a large cellular network provider's network, may serve different purposes. Some exemplary different purposes for different radios in a large network include, e.g., providing umbrella coverage, providing coverage fill, providing capacity fill, and supporting a private network, which is part of the large network.

On top of serving different purposes, different radios corresponding to different cells in a large network could also be part of different network slices. For example, the entire network is a different slice or part of the network serves as a separate slice to provide different services.

Because of the multi-service nature of these cellular network provider networks and the large number of cells included in such a network, different cells, e.g., different small cells, in the network may be, and sometime are, configured differently. For instance, different groups of cells may implement different policies and the radios of the different groups of cells may configured differently to support the different policies.

A common problem that occurs across different operators is misconfiguration of one or more radios, which usually causes problems for end users. The miss-configuration may be due to using default manufacturer settings rather than settings which are preferred by the network operator for the particular purpose and/or intended cell coverage area or for other reasons. Exemplary problems experienced by ends users due to radio misconfiguration include performance degradation problems, charging policy problems, mobility problems, and problems implementing operator policies in general. These problems can cause end user churn as well as loss of revenue.

Based on the above discussion, there is a need for new method and apparatus for auditing radio configuration settings in a network, identifying discrepancies between radio settings and those intended by the network operator, and automatically correcting identified discrepancies.

SUMMARY

A Configuration Auditor and Configuration Enforcer (CACE) function, in accordance with the present invention, runs audits for cells, e.g., for each cell, in a network and finds any discrepancies in the configurations, e.g., radio configurations. The CACE has access to lists of parameters and preferred settings for the network operator in which the cell being audited is located and thus knows the preferred settings for the given type of radio being audited and/or use of the radio in terms of the intended coverage area and/or traffic type being communicated. The list of parameters to which the actual radio settings is compared is sometimes referred to as a "golden parameter list" since it indicates the preferred or "golden" parameter settings for a given radio type/application in the particular network in which the radio of a cell is located. The detection of radio parameter setting discrepancies, e.g., setting errors, and the correction of the parameter settings is performed in an automated manner without having to disrupt ongoing service.

In some embodiments, the CACE is implemented as a separate function which complements an OSS. In some other embodiments, the CACE function is implemented as a part of an operations support system (OSS).

If one or more discrepancies are found for an audited cell, the CACE function will find the library of Configuration Management (CM) for the given radio(s), corresponding to the audited cell with the problem, and determine the appropriate time and/or maintenance window for updates and then apply the updates to the radio(s) at the appropriate time and/or during any appropriate maintenance window. Parameters which can be changed on the fly can be, and sometimes are, updated immediately when an audit determines a parameter change is to be made due to a miss-match between an existing setting and the preferred setting indicated in the golden parameter list. Parameters requiring a reboot to of the radio and/or cell are updated during a maintenance window when it is determined that a change is to be made to avoid interference with ongoing service.

In a first step, in accordance with an exemplary embodiment, the CACE fetches the configuration settings of a radio, e.g., sending a request (e.g., including a cell ID and a radio S/N) for radio configuration information, and obtaining, in response to the request, the current actual configuration settings of the radio.

In a second step, in accordance with an exemplary embodiment, the CACE performs an audit, e.g., the CACE compares the obtained current actual configuration settings of the radio with the desired (intended) configuration settings for the radio, which are in a library database (e.g., a network service provider's library of golden parameter files) to identify any discrepancies, e.g., radio configuration setting mismatches.

If discrepancies are found, in a third step in accordance with an exemplary embodiment, the CACE generates one or more configuration updates to be sent to the radio with the identified configuration mismatch. In a fourth step the CACE determines when each of one or more updates should be communicated to the radio, e.g., immediately on the fly or during a particular maintenance window, and performs each of the updates at the appropriate time.

An exemplary method of controlling cell configurations, in accordance with some embodiments, comprises: retrieving first cell radio configuration information indicating radio configuration settings of a first radio in the first cell, said first radio being of a first radio type, said first cell radio configuration information indicating a current radio configuration of the first cell; accessing stored first type radio configuration information, said stored first type radio configuration information specifying radio configuration settings to be used for radios of the first type; identifying, e.g., by performing an audit, radio settings in the retrieved first cell radio configuration information which differ from the accessed stored first type radio configuration information; and taking action to automatically correct one or more identified radio settings which differ from the corresponding setting indicated in the accessed stored first type radio configuration information.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 5 comprises the combination of FIG. 5A and FIG. 5B.

FIG. 6B is a second part of a flowchart of an exemplary method of controlling cell configurations in accordance with an exemplary embodiment.

FIG. 6 comprises the combination of FIG. 6A and FIG. 6B.

FIG. 7 comprises the combination of FIG. 7A and FIG. 7B.

FIG. 8 comprises the combination of FIG. 8A and FIG. 8B.

FIG. 16 comprises the combination of FIG. 16A and FIG. 16B.

FIG. 18 comprises the combination of FIG. 18A and FIG. 18B.

FIG. 19 is an exemplary CACE audit results summary chart, for an exemplary gNB in network operator 1's network, identifying the radio configuration parameters which require updating.

DETAILED DESCRIPTION

Figure 1:
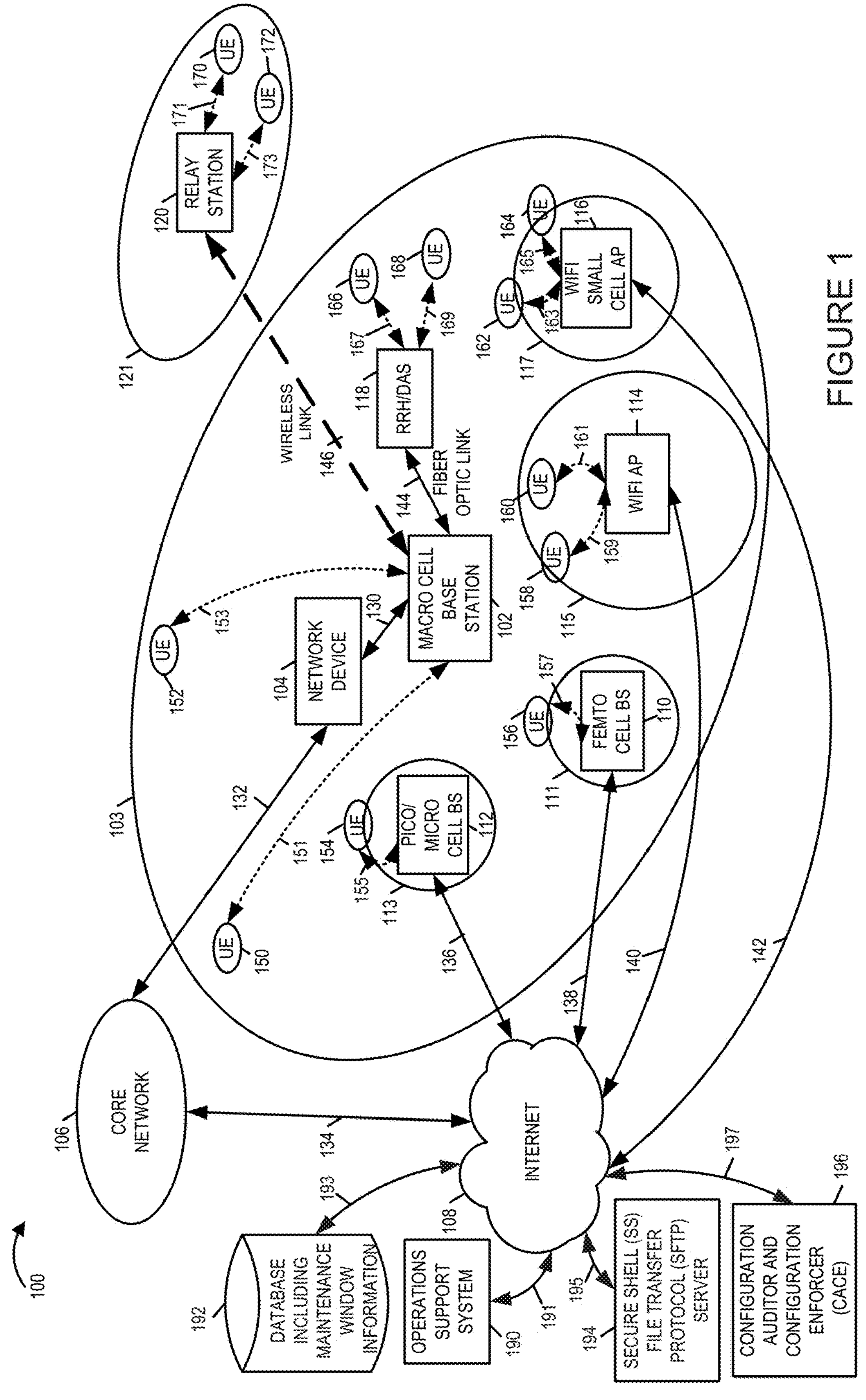
FIG. 1 is a drawing of an exemplary communications system in accordance with an exemplary embodiment, said exemplary communications system including a Configuration Auditor and Configuration Enforcer (CACE).

FIG. 1 is a drawing of an exemplary communications system 100 in accordance with an exemplary embodiment, said exemplary communications system 100 including a Configuration Auditor and Configuration Enforcer (CACE) 196. Exemplary communications system 100 includes macro cell base station 102, network device 104, core network 106, Internet 108, femto cell base station (BS) 110, pico/micro cell base station 112, WiFi access point (AP) 114, WiFi small cell access point (AP) 116, Remote Radio Head/Distributed Antenna System (RRH/DAS) 118, and relay station 120, coupled together as shown. Macro cell base station 120 is coupled to network device 104, e.g., a router, via communications link 130, e.g., a wired or fiber optic link. Network device 104 is coupled to core network 106, e.g., a 5G core network, via communications link 132, e.g., a wired or fiber optic link. Core network 106 is coupled to Internet 108, via communications link 134, e.g., a wired or fiber optic communications link. Femto cell BS 110 is coupled to Internet 108 via communications link 138, e.g., a wired or fiber optic link. Pico/micro cell BS 112 is coupled to Internet 108 via communications link 136, e.g., a wired or fiber optic link. WiFi AP 114 is coupled to Internet 108 via communications link 140, e.g., a wired or fiber optic link. WiFi small cell AP 116 is coupled to Internet 108 via communications link 142, e.g., a wired or fiber optic link. Macro cell BS 102 is coupled to RRH/DAS 118 via fiber optic link 144. Relay station 120 is coupled to macro cell base station 102 vis wireless link 146.

Communications system 100 further includes a plurality of UEs (UE 150, UE 152, UE 154, UE 156, UE 158, UE 160, UE 162, UE 164, UE 166, UE 168, UE 170, . . . , UE 172). At least some of the UEs are mobile wireless devices which may move throughout the system 100 and be connected to different radio access network nodes at different times.

Macro cell base station 102 has a corresponding wireless coverage cellular area 103. Femto cell base station 110 has a corresponding wireless coverage cellular area 111. Pico/micro cell base station 112 has a corresponding wireless coverage cellular area 113. WiFi AP 114 has a corresponding wireless cellular coverage area 115. WiFi small cell AP 116 has a corresponding wireless cellular coverage area 117. Relay station 120 has a corresponding wireless cellular coverage area 121.

UE 150 and UE 152 are connected to macro cell BS 102 via wireless communications links (151, 153), respectively. UE 154 is coupled to pico/micro cell BS 112 via wireless communications link 155. UE 156 is coupled to femto cell BS 110 via wireless communications link 157. UE 158 and UE 160 are coupled to WiFi AP 114 via wireless communications links (159, 161), respectively. UE 162 and UE 164 are coupled to small cell WiFi AP 116 via wireless communications links (163, 165), respectively. UE 166 and UE 168 are coupled to RRH/DAS 118 via wireless communications links (167, 169), respectively. UE 170 and UE 172 are coupled to relay station 120 via wireless communications links (171, 172), respectively.

System 100 further includes an operations support system 190, a database including maintenance window information 192, a secure shell (SS) file transfer protocol (SFTP) server 194, and a configuration auditor and configuration enforcer (CACE) 196 coupled to Internet 108 via communications links (191, 193, 195, 197), respectively.

Each of the wireless communications devices (macro cell base station 102, femto cell base station 110, pico/micro cell base station 112, WiFi access point 114, WiFi small cell AP 116, RRH/DAS 118, and relay station 120) includes one or more radios. For example, a radio, being of a particular radio type and having a radio serial number, in a wireless communications device, corresponds to a cellular coverage area, which may be a cell or a sector or cell, is identified by a cell ID. Each radio is configured with a set of configuration settings. It is desired that the radio configuration settings installed in each radio for each cell in the network match the intended golden parameter settings for the service provider network. A particular service provider network may, and sometimes does, desire to have different configuration settings in a radio than default or factory settings. The correct (intended set of configuration settings) is not always installed in a radio, e.g., for any of a number of reasons, e.g., factory load error, initial load error, failure to customize to the network, operator error, device error, version change, network reconfiguration, power outage and reset to default settings, etc.

CACE 196 performs audits of radio configuration settings, e.g., checking configuration setting values currently in the radios against a set of intended golden parameter values for the radios of the cells of the service provider's network, e.g., identifying discrepancies. Subsequently, the CACE generates updates to correct the discrepancies and sends the updates to the radios for installation, e.g., at appropriate times, e.g., on the fly when possible, or during a scheduled maintenance interval, e.g., with a reboot. Some configuration parameters can be changed on the fly without impacting operations, while other parameters cannot, e.g., and require a reset. In some embodiments, flags are associated with each parameter to identify the type of parameter, e.g., a parameter which can be changed on the fly or a parameter which requires a reboot or manual intervention to change.

Figure 2:
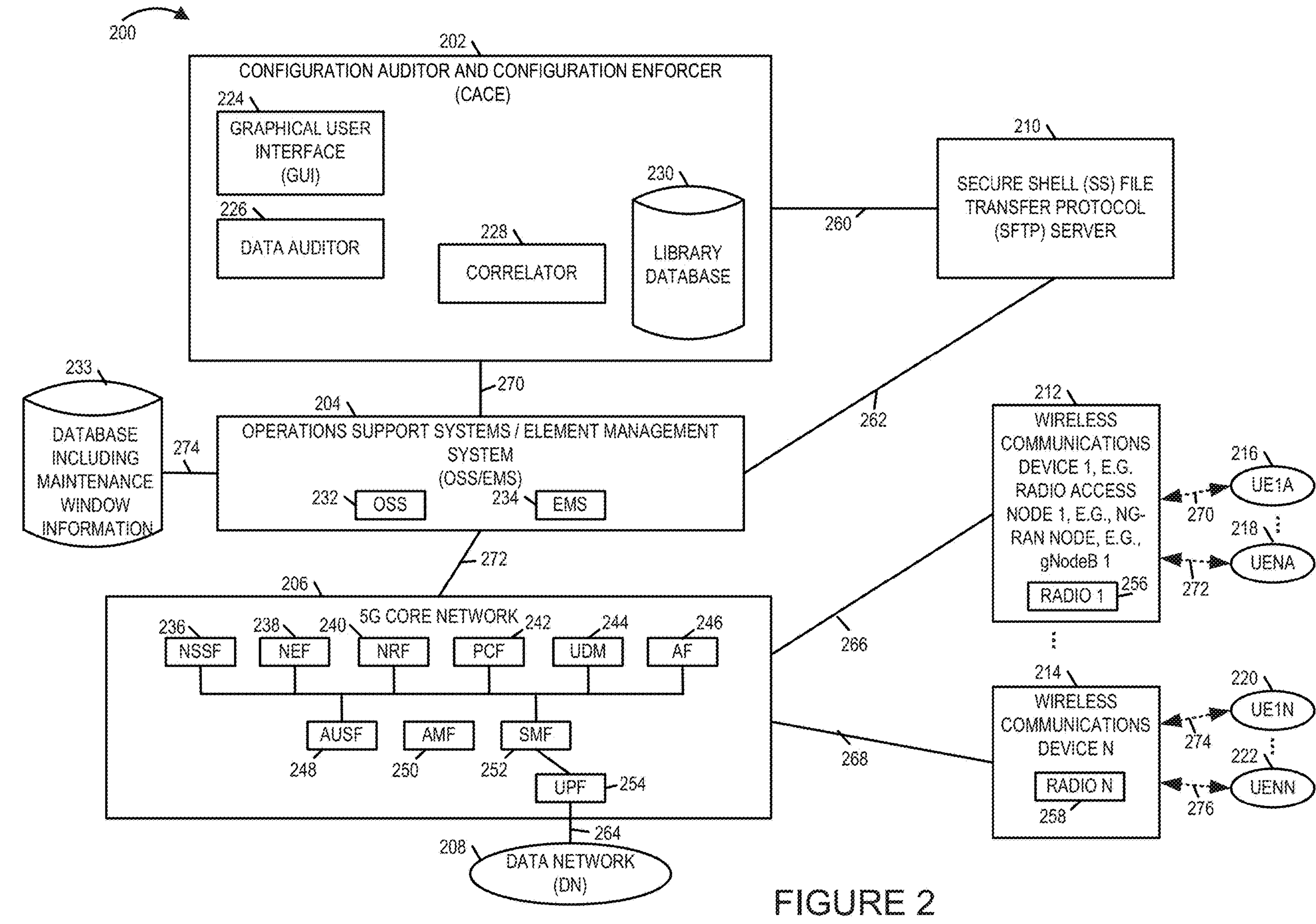
FIG. 2 is a drawing of an exemplary communications system in accordance with an exemplary embodiment, said exemplary communications system including a Configuration Auditor and Configuration Enforcer (CACE).

FIG. 2 is a drawing of an exemplary communications system 200 in accordance with an exemplary embodiment, said exemplary communications system 200 including a Configuration Auditor and Configuration Enforcer (CACE) 202. Exemplary communications system 200 includes CACE 202, Operations Support Systems/Element Management System (OSS/EMS) 204, 5G core network 206, Data Network (DN) 208, secure shell (SS) file transfer protocol (SFTP) server 210, a plurality of wireless communications devices, which support wireless communications with UEs (wireless communications device 1 212, . . . , wireless communications device N 214), and a database including maintenance window information 233 coupled together as shown. CACE 202 is coupled to OSS/EMS 204 via communications link 270, e.g., a wired or fiber link. OSS/EMS 204 is coupled to 5G core network 206 via communications link 272, e.g., a wired or fiber optic link. OSS/EMS 204 is coupled to database 233 via communications link 274, e.g., a wired or fiber optic link. CACE 202 is coupled to SFTP server 210 via communications link 260, e.g., a wired or fiber optic link. SFTP server 210 is coupled to OSS/EMS 204 via communications link 262, e.g., a wired or fiber optic link. Wireless communications device 1 212, e.g., radio access network node 1, e.g., a NG-RAN node 1, e.g., gNodeB 1, is coupled to 5G core network 206 via communications link 266, e.g., a wired or fiber optic link. Wireless communications device N 214 is coupled to 5G core network 206 via communications link 268, e.g., a wired or fiber optic link.

CACE 202 includes a graphical user interface (GUI) 224, a data auditor 226, a correlator 228 and a library database 230 coupled together. OSS/EMS 204 includes OSS 232 and EMS 234 coupled together. 5G core network 206 includes a network slice selection function (NSSF) 236, a network exposure function (NEF) 238, a network repository function (NRF) 240, a policy control function (PCF) 242, a unified data management (UDM) 244, an application function (AF) 246, an authentication and security function (AUSF) 248, an access and mobility management function (AMF) 250, a session management function (SMF) 252, and a user plane function (UPF) 254 coupled together as shown. UPF 254 is coupled to DN 208 via communications link 264.

Exemplary system 200 further includes a plurality of user equipments (UE1A 216, . . . , UENA 218, . . . , UE1N 220, . . . . UENN 222). UE1A 216 and UENA 218 are coupled to wireless communications device 1 212, e.g., gNB1, via wireless communications links (270, 272), respectively. UE1N 220 and UENN 222 are coupled to wireless communications device N 214 via wireless communications links (274, 276), respectively.

Wireless communications device 1 212 includes one or more radios including radio 1 256. Wireless communications device N 214 includes one or more radios including radio N 258.

In one exemplary embodiment, CACE 202 is CACE 196 of FIG. 1; OSS 232 is OSS 190 of FIG. 1; SFTP server 210 is SFTP server 194 of FIG. 1; core network 206 is core network 106 of FIG. 1, and database 233 is database 192 of FIG. 1; wireless communications devices (212, . . . , 214) are any of macro cell base station 102, femto cell base station 110, or pico cell base station 112 of FIG. 1; and UEs (216, 218, 220, 222) are any of UEs (150, 152, 154, 156, 158, 160, 162, 164, 166, 168, 170, 172) of FIG. 1.

In another exemplary embodiment, CACE 202 is CACE 196 of FIG. 1; OSS 232 is OSS 190 of FIG. 1; SFTP server 210 is SFTP server 194 of FIG. 1; core network 206 is core network 106 of FIG. 1, and database 233 is database 192 of FIG. 1; wireless communications devices (212, . . . , 214) are any of macro cell base station 102, femto cell base station 110, pico cell base station 112, WiFi AP 114, WiFi small cell AP 116, RRH/DAS 118, or relay station 120 of FIG. 1; and UEs (216, 218, 220, 222) are any of UEs (150, 152, 154, 156, 158, 160, 162, 164, 166, 168, 170, 172) of FIG. 1.

Figure 3:
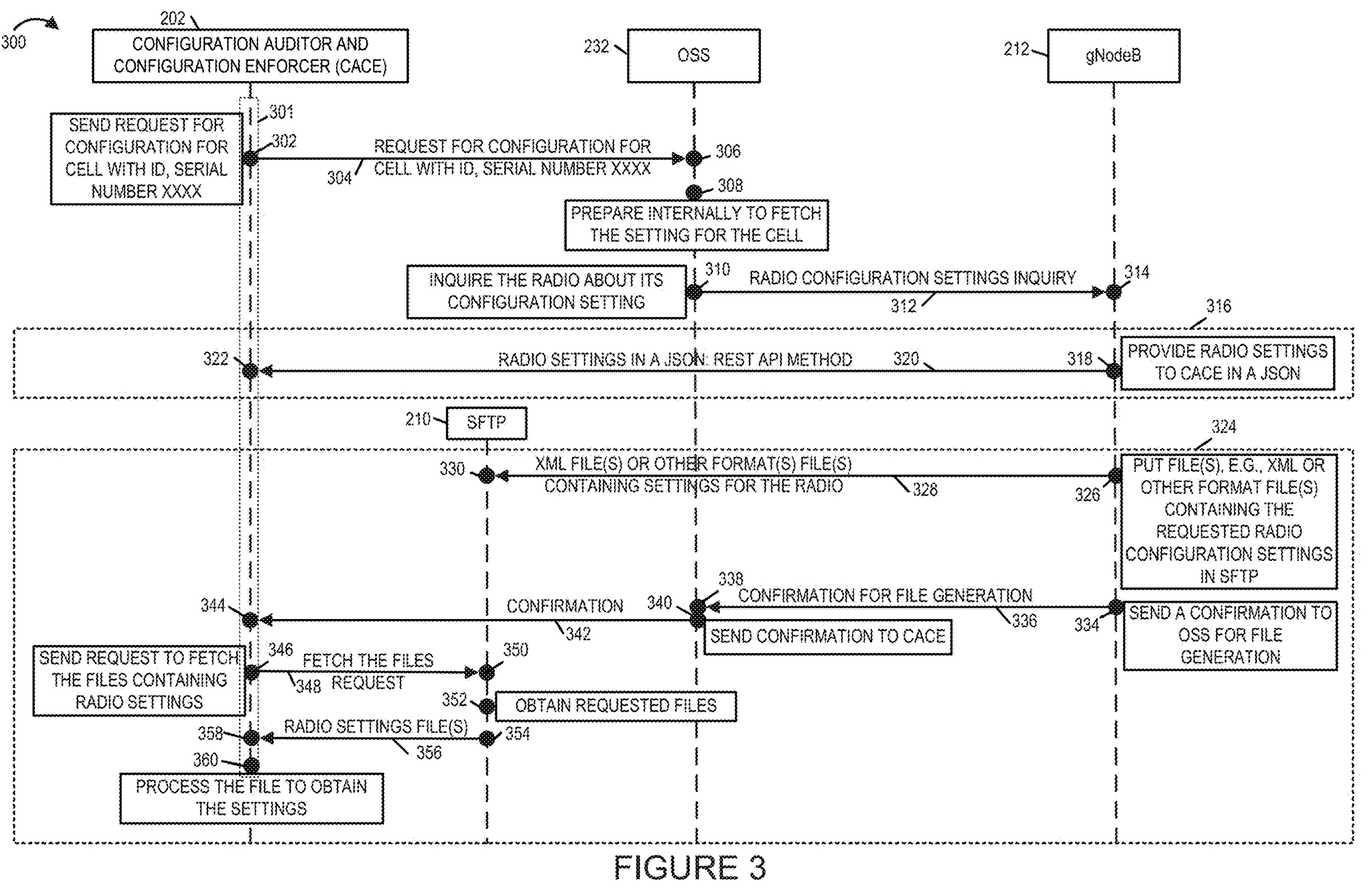
FIG. 3 is a signaling diagram illustrating operations for obtaining configuration settings for a radio as part of a method of controlling cell configurations in a network in accordance with an exemplary embodiment.
Figure 4:
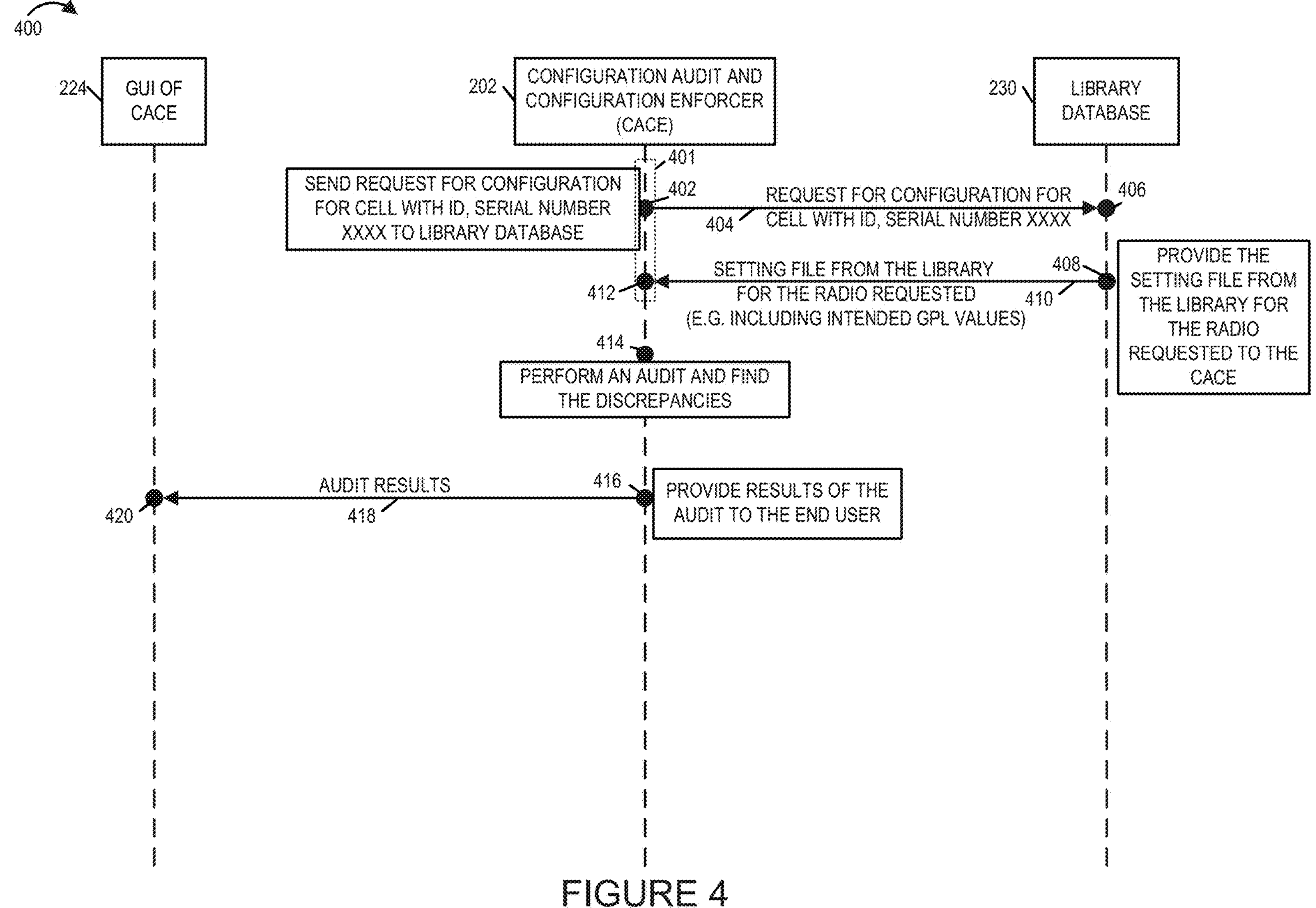
FIG. 4 is a signaling diagram illustrating a CACE performing an audit of obtained current configuration settings of a radio as part of a method of controlling cell configurations in a network in accordance with an exemplary embodiment.

The combination of FIG. 3, FIG. 4 and FIG. 5 illustrates an exemplary method of controlling cell configurations in a network in accordance with an exemplary embodiment.

FIG. 3 is a signaling diagram 300 illustrating operations for obtaining configuration settings for a radio as part of a method of controlling cell configurations in a network in accordance with an exemplary embodiment.

In step 302 configuration auditor and configuration enforcer (CACE) 202 generates and sends a request 304 for configuration for a cell with a specified cell ID and radio with a specified S/N. In step 306 the OSS 232 receives the request 304 and recovers the communicated information. In step 306, the OSS prepares internally to the fetch the settings for the cell. In step 310, in response to the received request 304, the OSS generates and sends radio configuration settings inquiry 312 to gNodeB 212 (which corresponds identified cell) to inquire the radio included in gNodeB 212, which corresponds to the identified cell) about its configuration settings. In step 314 gNode B 212 receives the radio configuration setting inquiry 312.

There are two alternative approaches which may be used to deliver the requested radio configuration settings to the CACE 202, e.g., depending upon the implementation. In a first approach, as indicated by dashed block 316, gNodeB 212 obtains the settings for its radio and places the radio configuration settings directly on the CACE 202. In step 318, gNodeB 212 obtains its radio configuration settings, generates a JSON including the radio configuration settings and sends signals 320 conveying the JSON to the CACE 202. Thus, in step 318 gNodeB 202 provides the requested radio configuration settings directly to the CACE 202 via JSON. In step 322 the CACE 202 receives signals 320 conveying the JSON and recovers the requested radio configuration settings from the JSON.

In a second approach, as indicated by dashed block 324, the radio configuration settings are delivered to the CACE 202 via an intermediary, e.g., SFTP server 210. In step 326 gNodeB 212 obtains its radio configuration settings, puts the radio configuration setting in a file(s), e.g., an XML or other format file(s), and sends signals 328 communicating the XML file(s) or other format file(s) containing the configuration settings of the radio, to SFTP server 210, which receives and stores the files in step 330. Subsequently, in step 334 gNodeB 212 generates and sends a confirmation 336 to OSS 232 indicating that a file including the requested radio configuration information has been generated and stored in SFTP server 210. In step 338, OSS 213 receives the confirmation 336, and in response in step 340, the OSS 232 generates and sends confirmation message 342, e.g., a forwarded copy of confirmation message 336, to CACE 202. In step 344, the CACE 202 receives the confirmation message 342, and in response, in step 346, the CACE 202 generates and sends request message 348 to SFTP server 210 to request the files which include the radio configuration settings for the requested radio corresponding to the cell of gNodeB 212. In step 350, the SFTP server 210 receives the request 348 to fetch the files. In step 352, the SFTP server 210 obtains the requested file(s) from among a plurality of files stored on SFTP server 210, e.g., based on identification information included in the request 348, e.g., gNodeB ID, cell ID, radio S/N, etc. In step 354 the SFTP server 210 generates and sends signals 356 conveying the obtained files including the requested radio configuration setting information to CACE 202. In step 358, CACE 202 receives signals 356 and recovers the communicated file(s), e.g., an XML file, including the radio configuration setting information for the requested radio (e.g., identified by a radio S/N) for the cell (e.g., identified by a cell ID), which corresponds to gNodeB 212. In step 360 CACE 202 processes the received file or files, e.g., a received XML file, and obtains the requested radio configuration setting, corresponding to the request 304. Thus, the CACE has obtained the set of actual currently loaded radio configuration settings for a particular radio (of a particular radio type with a radio SN) in gNodeB 212 corresponding to a particular cell (with a cell ID).

Dashed box 301, which includes steps 302, 322, 344, 346, 358 and 360 may be viewed as a step of retrieving, at Configuration Auditor and Configuration Enforcer (CACE) 202, first cell radio configuration information indicating radio configuration settings of a first radio in the first cell, said first radio being of a first radio type, said first cell radio configuration information indicating a current radio configuration of the first cell.

FIG. 4 is a signaling diagram 400 illustrating a CACE 202 performing an audit of obtained current configuration settings of a radio as part of a method of controlling cell configurations in a network in accordance with an exemplary embodiment. In step 402 the CACE 202 sends a request 404 to library database 230 for radio configuration setting information (e.g., intended golden parameter list (GPL) values) for the radio of interest, e.g., the identified radio corresponding to the identified cell which is included in gNB 212. In some embodiments, the request 404 sent to the library database includes: one or more of all of: a cell ID, a radio S/N, a gNodeB ID and a gNB S/N, used to identify the particular radio in the network for which radio configuration setting information, e.g., set of golden parameter values, is to be retrieved from the library database. In some embodiments, library database 230 is an internal component of CACE 202, while in other embodiments, the library database 230 may be external to CACE 202 but accessible to CACE 202. The library database 230 has a mapping, for each radio or each radio type, to a set of radio configuration setting values, which are intended to be entered when a radio is purchased by the network service provider and first provisioned into the network. Thus, for each radio or radio type in the network, the library database 230 includes a set of intended radio configuration setting values (golden parameter values) which are to be installed in the radio, e.g., for optimal operation of the radio, in accordance with the intended use of the radio in network. In some embodiments, depending on various factors, e.g., cell size, power constraints, type of service, uses cases, a particular model of radio may be assigned a different set of radio configuration setting golden parameters to be installed, when installed at a different location in the network. In some embodiments, the radios in the network are grouped into different sets, and each set corresponds to a different stored radio configuration setting file (e.g., a different stored file including a set of intended golden parameter file (GPL) values and information classifying each parameter as to whether: i) the parameter can be changed on the fly or ii) reboot and/or manual intervention is needed to change the parameter, e.g. indicating that the parameter is to be changed during a suitable maintenance window.)

In some embodiments, the library has a mapping for each radio type which will be entered in advance when a radio is bought first provisioned. In some embodiments, this mapping is simple and based on the type of services and use cases. In some embodiments, flags can be, and sometimes are, defined for the services and/or settings.

In step 406 the library database 230 receives the request 404 for stored configuration information, and recovers the communicated information, e.g., identifying the particular radio in the network for which the radio configuration information is being requested, and, e.g., via a mapping lookup, identifies the particular stored radio configuration setting file in the library which corresponds to the radio for which information is being requested. In step 408 the library database 230 provides the identified setting file 410 from the library database for the requested radio to the CACE 200. Thus in step 408 the library database 230 sends the setting file 410 (e.g. including intended golden parameter list (GPL) radio configuration setting values for the radio) from the library for the requested radio to the CACE 202.

Dashed box 401, which includes steps 402 and 412 may be viewed as a step of accessing, at Configuration Auditor and Configuration Enforcer (CACE) 202, stored first type radio configuration information, said stored first type radio configuration information specifying radio configuration settings to be used for radios of the first type.

In step 414 the CACE 202 performs an audit and finds any discrepancies between: i) the actual current configuration settings in the radio being audited, which were obtained in step 322 (e.g., from JSON) or in step 360 (e.g., from an XML file), and ii) the intended configuration settings for the radio, which were obtained in step 412 (e.g., from a received setting file from the library database including intended GPL values for the radio). Thus in step 414, the CACE 202 compares each of the radio configuration setting parameter values from the two sources and identifies any mismatches. The intent is that any current actual configuration setting values in the radio being audited that are identified as not matching the intended values from the library database file for the radio are to be flagged as a mismatch and eventually changed to match the library database value, e.g., when convenient.

In step 416 the CACE 202 provides the audit results 418 to the graphical user interface (GUI) of the CACE. In step 420 the GUI 224 receives the audit results, and presents, e.g., displays, the audit results to an operator, e.g., system administrator, of the CACE 202.

Figure 5A:
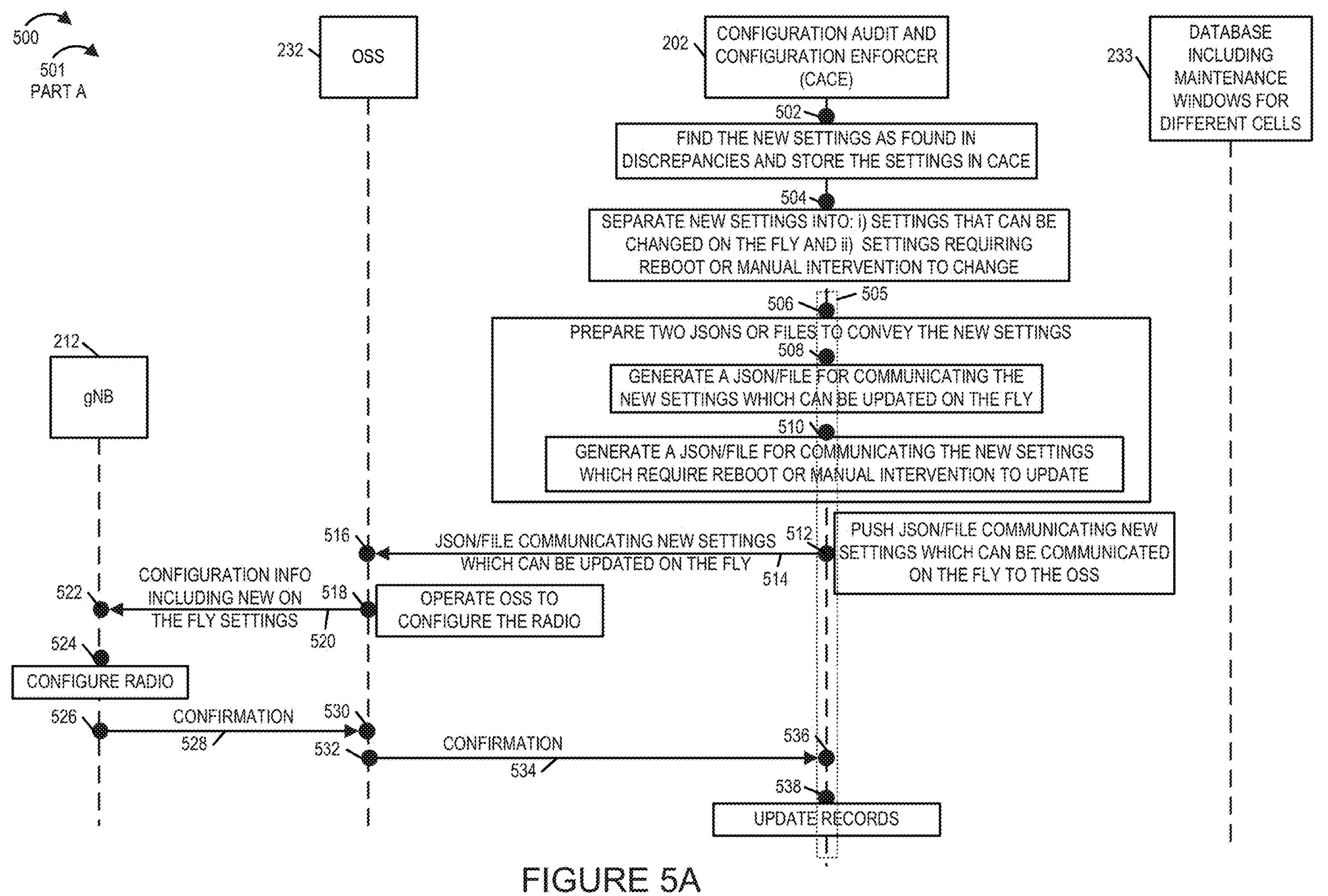
FIG. 5A is a first part of a signaling diagram illustrating a CACE storing results from an audit, categorizing configuration setting updates, generating JSONs or files to convey the updates, determining when to push the updates, and pushing the updates at the appropriate time, as part of a method of controlling cell configurations in a network in accordance with an exemplary embodiment.
Figure 5B:
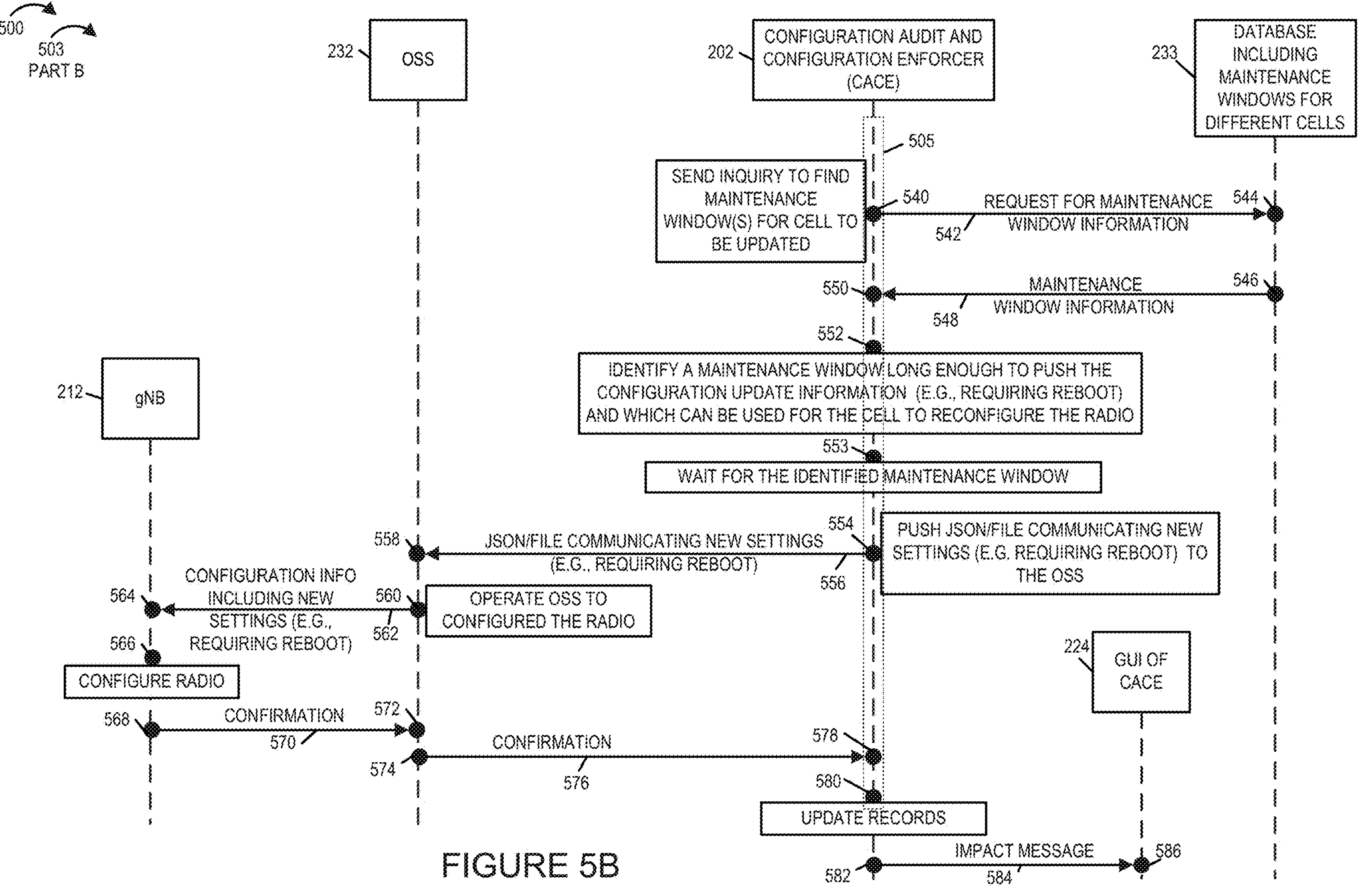
FIG. 5B is a second part of a signaling diagram illustrating a CACE storing results from an audit, categorizing configuration setting updates, generating JSONs or files to convey the updates, determining when to push the updates, and pushing the updates at the appropriate time, as part of a method of controlling cell configurations in a network in accordance with an exemplary embodiment.

FIG. 5 comprising the combination of FIG. 5A and FIG. 5B is a signaling diagram 500, comprising Part A 501 and Part B 503, said signaling diagram 500 illustrating a CACE 202 storing results from an audit, categorizing configuration setting updates, generating JSONs or files to convey the updates, determining when to push the updates, and pushing the updates at the appropriate time, as part of a method of controlling cell configurations in a network in accordance with an exemplary embodiment.

In step 502 the CACE 202 finds the new settings (e.g., based on the audit and identified discrepancies, the CACE identifies the radio configuration parameters which are to be updated and identifies the corresponding new radio configuration settings which are to be installed as part of an update to replace current radio configuration settings) as found in the discrepancies from the audit of step 414, and stores the new settings (e.g., information indicating the particular radio configuration setting parameter names and the corresponding new radio configuration setting parameter values) in memory in the CACE 202. In step 504, the CACE 202 separates the new settings into: i) settings that can be changed on the fly and ii) settings requiring reboot or manual intervention to change. In some embodiments, each radio configuration parameter, e.g., in a golden parameter list, is associated with a service impact category designation, said service impact category designation being one of: i) on the fly or ii) requires a reboot.

In step 506 the CACE 202 prepares two JSONs or two files to convey the new settings (e.g., for the case in which both on-the fly and reboot required parameters need to be updated.) If only parameters of one type (e.g., on the fly or reboot required) are identified by the audit as needing update, then only one JSON or one file is prepared. Step 506 includes step 508 and step 510. In step 508 the CACE 202 generates a JSON or file for communicating the new settings which can be updated on the fly. In step 510 CACE 202 generates a JSON or file for communicating the new settings which require reboot or manual intervention to update.

In step 512 the CACE 202 pushes the JSON or file communicating the new settings which can be updated on the fly 514 to the OSS 232. Step 512 can be, and sometimes is, performed immediately following the completion of step 508. In step 516 the OSS 232 receives the JSON or file communicating the new settings which can be updated on the fly, and recovers the information identifying the parameters, e.g., parameter names, and new corresponding new values to be installed in the radio. In step 517 the OSS 232 configures the radio in gNB 212, e.g., sending configuration information 520 including new radio configuration setting values, which can be installed on the fly. In step 522, the gNB receives configuration information 520, and in response in step 524 gNB 212 configures its radio, e.g., installing the new radio configuration setting values which were communicated in information 520. In step 526, gNB 212 generates and sends confirmation message 528 to the OSS 232, which confirms that the gNB 212 has successfully re-configured its radio to install the new configuration setting values of message 520. In step 530 the OSS receives the confirmation message 528, and in response in step 532 the OSS generates and sends confirmation message 534 to CACE 202 confirming that the radio in gNB 212 has been reconfigured to include new settings (on-the fly settings) which were pushed in JSON/file 514. In step 536 the CACE 202 receives confirmation message 534, and in response, in step 538 the CACE 202 updates records in the CACE 202, e.g. indicating that the new “on the fly” configuration setting parameters have been successfully updated in the radio.

In step 540 the CACE 202 sends an inquiry, which is request for maintenance window information 542, to database 233 which include maintenance windows for different cells, to find a maintenance window(s) for the cell including the radio to be updated to be used to install the identified new radio configuration settings, e.g., which require a reboot to install. In step 544 the database 233 receives the request 542, identifies the cell from information included in the request message, e.g., gNB ID information and/or cell ID information, and identifies one or more scheduled maintenance windows corresponding to the cell of interest from stored information in database 233. Different scheduled maintenance windows corresponding to the same cell may have different time durations. In step 546, database 233 generates and sends maintenance window information 548 including information identifying one or more scheduled maintenance windows corresponding to the requested cell, to the CACE 202 in response to request message 542. In step 550 the CACE receives message 548 and recovers the communicated information. In step 552 the CACE 202 identifies a maintenance window, from the information communicated in message 548, long enough to push the configuration update information and which can be used for the cell to implement the update, e.g., wherein implementing the update includes rebooting the radio in the gNB 212. In step 553 the CACE 202 waits for the identified maintenance window. In step 554 the CACE 202 pushes the JSON 556 or file 556 communicating the new radio configuration setting values (e.g., requiring reboot) to the OSS 232. In step 558 the OSS 232 receives the JSON/file 556 and recovers the communicated information, e.g., information identifying which radio configuration setting parameters are to be updated and the new values to be installed. In step 560 the OSS 232 is operated to configure the radio in gNB 212, e.g., the OSS 232 sends radio configuration information 562 including new radio configuration setting values for one or more parameters (e.g., which require reboot as part of the installation process), to gNB 212. In step 564 gNB 212 receives configuration information 562 and recovers the communicated information. In step 566 gNB 212 configures its radio, e.g., installing the received new configuration setting values from message 562 in its radio and performing a reboot operation. In step 568 the gNB 212 generates and sends confirmation message 570 to OSS 232 indicating that the radio in gNB 212 has been reconfigured in accordance with the configuration information of message 562. In step 572 OSS 232 receives confirmation message 570, and in response, in step 574 the OSS 232 generates and sends confirmation message 576 to CACE 202. Confirmation message 576 indicates that the new radio configuration setting values of JSON/file 556 have been successfully installed in the radio of gNB 212. In step 578 the CACE 202 receives confirmation message 576, and in response, in step 580 the CACE 202 updates records in the CACE 202, e.g. indicating that the new “reboot required” configuration setting parameters have been successfully updated in the radio.

If there are any subsequent impacts, those would be issued to the GUI 224. In optional step 582, CACE 202 generates and sends message 584 to GUI 224. In step 586, the GUI 224 receives message 584 and presents impact information to the operator, e.g., administrator, of the CACE 202.

Dashed box 505, which includes steps 506, 508, 510, 512, 536, 538, 540, 540, 550, 552, 553, 554, 578 and 580) may be viewed as a step of taking action, at Configuration Auditor and Configuration Enforcer (CACE) 202, to automatically correct one or more identified radio settings which differ from the corresponding setting indicated in the accessed stored first type radio configuration information.

Figure 6A:
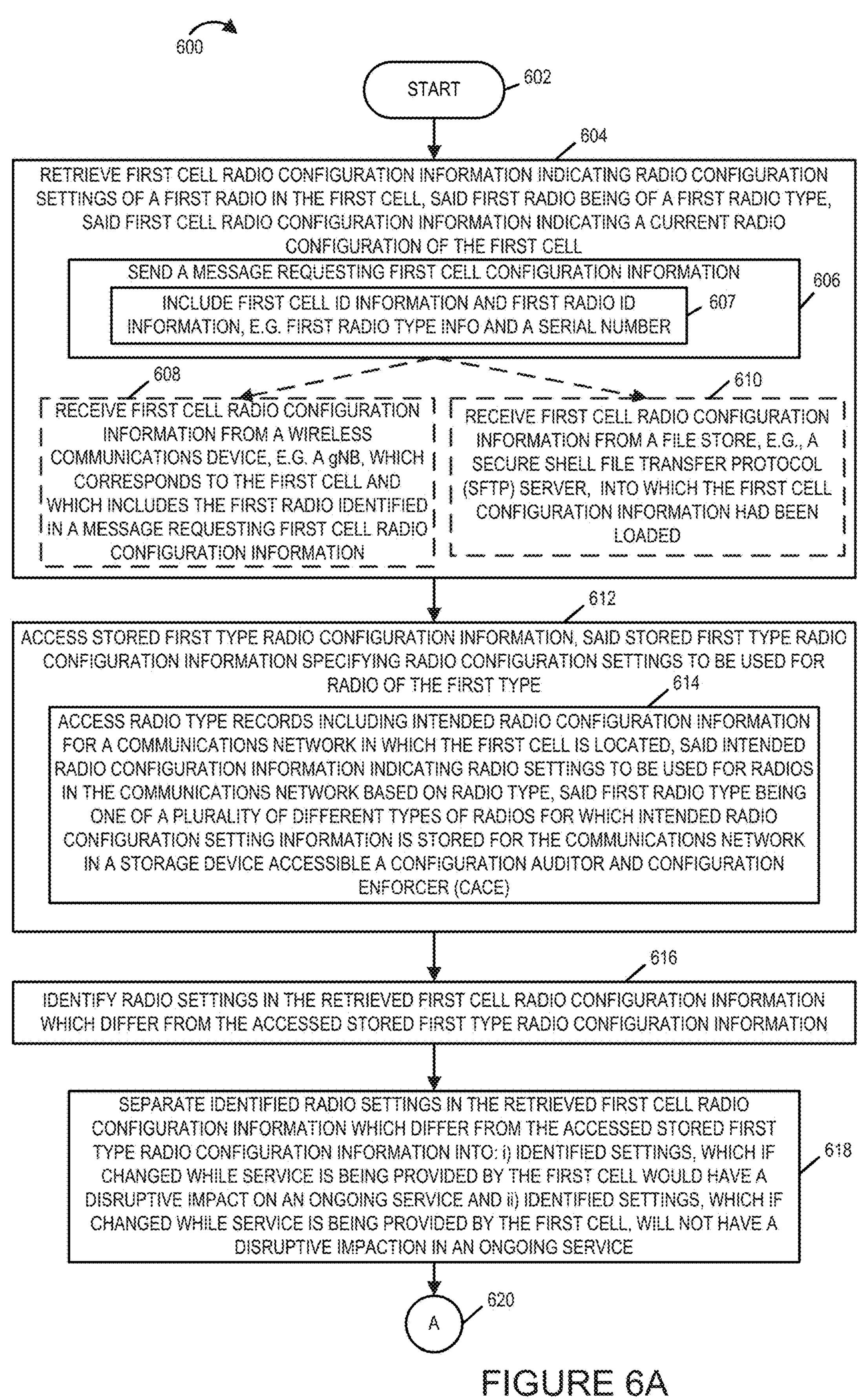
FIG. 6A is a first part of a flowchart of an exemplary method of controlling cell configurations in accordance with an exemplary embodiment.

FIG. 6, comprising the combination of FIG. 6A and FIG. 6B, is a flowchart 600 of an exemplary method of controlling cell configurations in accordance with an exemplary embodiment. In some embodiments, the exemplary method of flowchart 600 is performed by a Configuration Auditor and Configuration Enforcer (CACE), e.g., CACE 202 of FIGS. 2, 3, 4 and 5 or CACE 196 of FIG. 1. The exemplary method of flowchart 600 will be described for an exemplary embodiment in which CACE 202 performs the steps of the method. Operation starts in step 602 in which the CACE, e.g., CACE 202, is powered on and initialized. Operation proceeds from start step 602 to step 604.

In step 604 CACE 202 retrieves first cell radio configuration information indicating radio configuration settings of a first radio in a first cell, said first radio being of a first radio type, said first cell radio configuration information indicating a current radio configuration of the first cell. Step 604 includes step 606 and one of alternative step 608 or alternative step 610, depending upon the implementation. In step 606 CACE 202 send a message requesting first cell configuration information. In some embodiments, step 606 includes step 607, in which CACE 202 includes first cell ID information (e.g., a gNodeB ID and/or a cell ID and/or a gNB S/N) and first radio ID information (e.g., first radio type information and a serial number associated with the first radio, e.g., radio 1 256). For example, in step 606 CACE 202 sends a message with cell ID and/or gNB ID and radio serial number to an OSS, e.g., OSS 232, which then sends a request to the gNB (e.g., gNB 1 212 (which corresponds to cell 1)) identified in the message, to provide the requested first cell radio configuration information. Operation proceeds from step 606 to step 608 or 610, depending upon the implementation.

In step 608 the CACE 202 receives first cell radio configuration information, e.g., in a JSON object listing radio configuration settings in the form of parameters which can be set as part of configuring the first radio, from a wireless communications device, e.g., a gNB, which corresponds to the first cell and which includes the first radio identified in the message requesting first cell radio configuration information. Alternatively, in step 610 the CACE 202 receives first cell radio configuration information from a file store, e.g., a secure shell file transfer protocol (SFTP) server, into which the first cell configuration has been loaded. For example, in step 610 the CACE 202 receives the first cell radio configuration information from the SFTP server, e.g., SFTP server 210, into which the requested first cell radio configuration information was loaded by the cell (gNodeB, e.g., gNB 1 212) including the identified first radio, e.g., radio 1 256, said receipt of first cell radio configuration information being in the form of a fetched set of information or a file returned by the SFTP server, e.g., SFTP server 210, in response to a file fetch request made by the CACE 202 following sending of the message requesting first cell radio configuration information. Operation proceeds from step 604 to step 612.

In step 612 the CACE 202 accesses stored first type radio configuration information, said stored first type radio configuration information specifying radio configuration settings to be used for a radio of the first type. Step 612 includes step 614. In step 614 the CACE 202 accesses radio type records including intended radio configuration information for a communications network in which the first cell is located, said intended radio configuration information indicating radio settings to be used for radios in the first network based on radio type, said first radio type being one of a plurality of different types of radios for which intended radio configuration setting information is stored for the first network in a storage device accessible to the CACE 202. Operation proceeds from step 612 to step 616.

In step 616, the CACE 202 identifies, e.g., by performing an audit, radio settings in the retrieved first cell radio configuration information which differ from the accessed stored first type radio configuration information. Operation proceeds from step 616 to step 618.

In step 618 the CACE 202 separates identified radio settings in the retrieved first cell radio configuration information which differ from the accessed stored first type radio configuration information into: i) identified settings, which if changed while service is being provided by the first cell, would have a disruptive impact on ongoing service and ii) identified settings, which if changed while service is being provided by the first cell, will not have a disruptive impact on ongoing service.

Settings, which if changed while service is being provided by the first cell, would have a disruptive impact on ongoing service, include, e.g., settings which are not allowed to be changed on the fly, e.g. because changing such a setting on the fly would cause termination of an ongoing session or would cause an unacceptable delay in communications which are ongoing due to a setting reset, e.g., for a live service or ongoing communications session supported by the first cell, and settings which if changed require a reboot of the cell and/or cell radio.

In some embodiments, for each parameter in the accessed stored first type radio configuration information, there is a service impact field indicator indicating one of: i) on the fly (signifying that this parameter can be changed on the fly without impact to ongoing service) or ii) reboot required (indicating that this parameter should be changed during a maintenance window due to reboot required), and this service impact indicator field value is used in separating the identified radio settings which need to be changed (updated) into the two categories.

In some embodiments, settings which can be changed on the fly are settings which can be changed without having a disruptive impact on service. In some embodiments, setting changes which require a reboot of the cell or radio to which the change in setting is made are disruptive setting changes which would have a disruptive impact on ongoing service.

Operation proceeds from step 618, via connecting node A 620, to step 621. In step 621 the CACE 202 takes an action to automatically correct one or more identified radio settings which differ from the corresponding setting indicated in the accessed stored first type radio configuration information. Step 621 includes step 622 and step 626. One or both of steps 622 and 626 are performed for an iteration of step 621 depending on the type (e.g., can be changed on the fly without impacting ongoing operations, or cannot be changed on the fly due to impact to ongoing operations) of radio configurations setting(s) which were identified as needing to be changed.

In step 622 the CACE 202 takes an action to automatically correct one or more identified radio settings which differ from the corresponding settings indicated in the accessed stored first type radio configuration information and which, if changed while service is being provided by the first cell, will not have a disruptive impact on ongoing service. Step 622 includes step 624, in which the CACE 202 pushes an immediate radio parameter setting update, e.g., immediately without waiting for a first cell service update window (e.g., a first cell maintenance window), to update one or more identified radios settings to match corresponding radio settings in the stored first type radio configuration information.

In step 626 the CACE 202 takes an action to automatically correct one or more identified radio settings which differ from the corresponding settings indicated in the accessed stored first type radio configuration information and which, if changed while service is being provided by the first cell, will have a disruptive impact on ongoing service. Step 626 includes steps 628 and 630. In step 628 the CACE 202 waits for a first cell maintenance window before updating one or more identified radio settings for the first cell, which if changed while service is being provided by the first cell, would have a disruptive impact on ongoing service at the first cell. Operation proceeds from step 628 to step 630. In step 630 the CACE 202 pushes, during a first cell maintenance window following identification of radio settings in the retrieved first cell radio configuration information which differ from the accessed stored first type radio configuration information, a radio parameter setting update to update one or more identified radio settings, which if changed during a service period of the first cell would have a disruptive impact on service provided by the first cell, to match corresponding radio settings indicated in the stored first type radio configuration information.

Figure 7A:
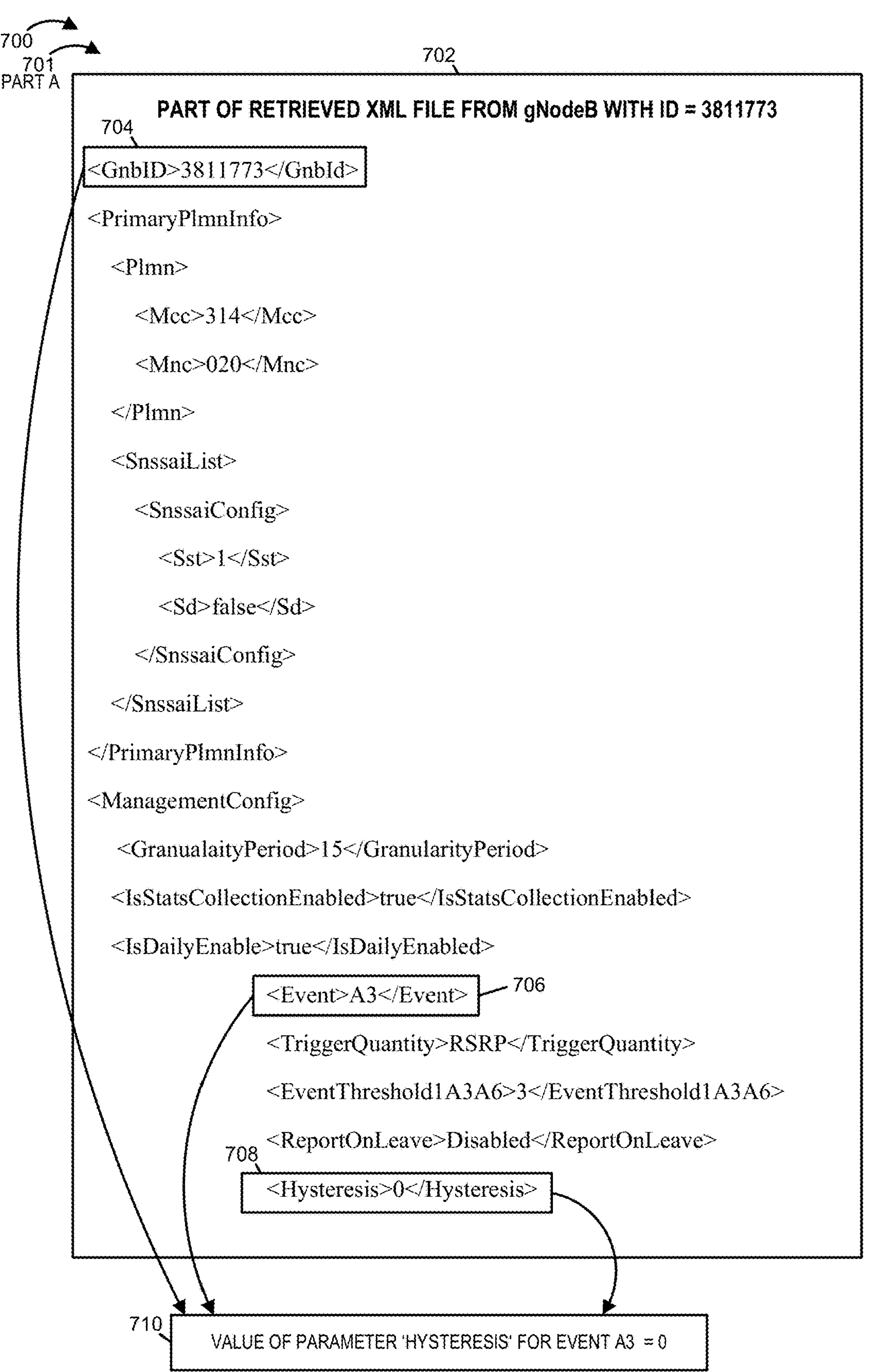
FIG. 7A illustrates a first part of an example depicting the difference in the parameter value of 'Hysteresis' in an exemplary mobile network operator's Golden Parameter List (GPL) and an in XML file corresponding to a particular GnbID, said difference to be detected by a CACE audit and automatically corrected, in accordance with an exemplary embodiment.
Figure 7B:
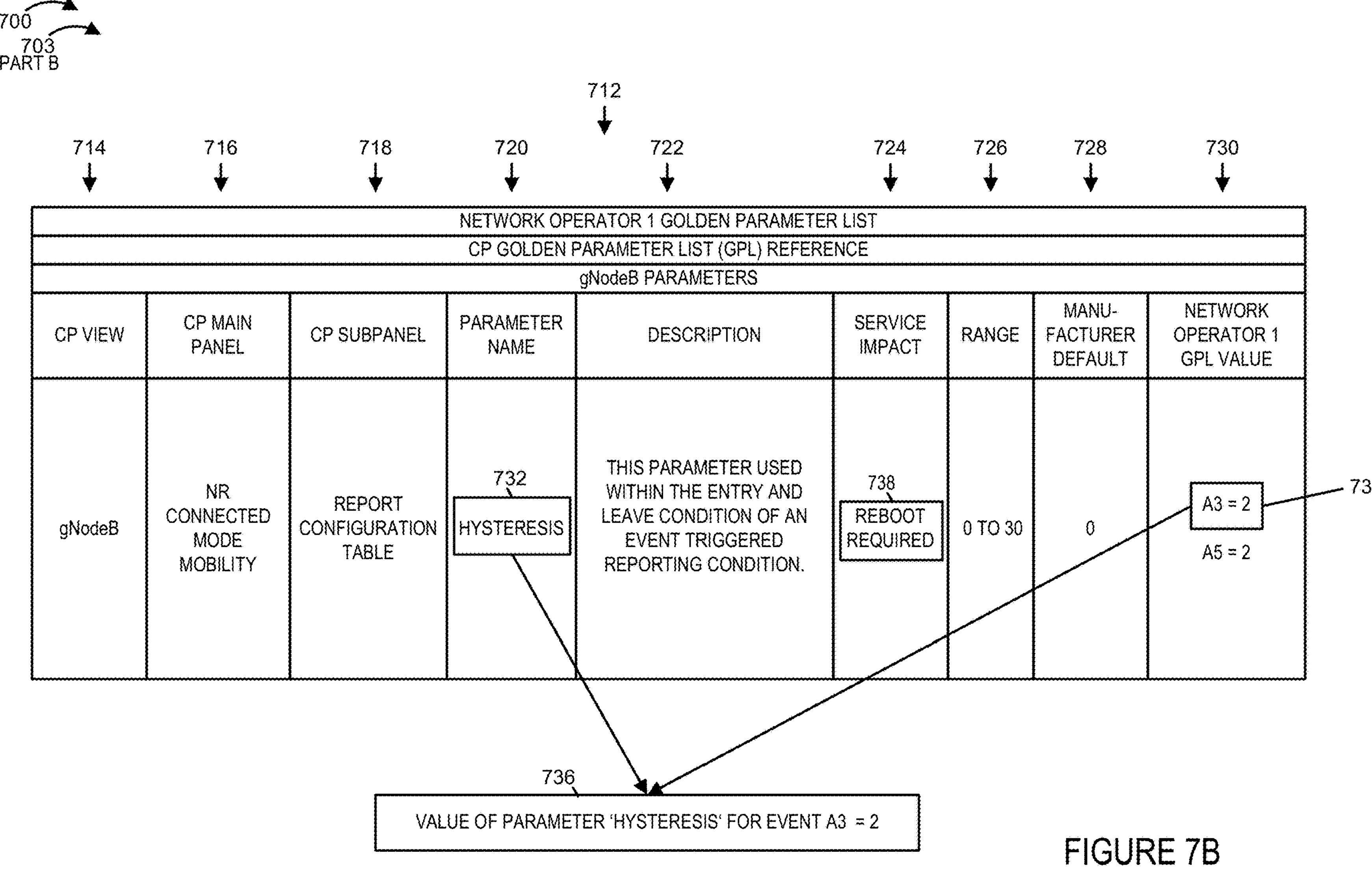
FIG. 7B illustrates a second part of an example depicting the difference in the parameter value of 'Hysteresis' in an exemplary mobile network operator's Golden Parameter List (GPL) and in an XML file corresponding to a particular GnbID, said difference to be detected by a CACE audit and automatically corrected, in accordance with an exemplary embodiment.

FIG. 7, comprising the combination of FIG. 7A and FIG. 7B, is a drawing 700, including Part A 701 and Part B 703, illustrating an example depicting the difference in the parameter value of 'Hysteresis' in an exemplary mobile network operator's Golden Parameter List (GPL) and in a XML file corresponding to a particular GnbID, said difference to be detected by a CACE audit and automatically corrected, in accordance with an exemplary embodiment.

Part A 701 of drawing 700, shown in FIG. 7A includes block 702 which includes part of an exemplary retrieved XML file from an exemplary gNodeB with GnbID=3811733. The exemplary retrieved XML file is, e.g., XML file 328 which includes the radio configuration settings for the radio in gNodeB 212, which is stored by gNodeB 212 in SFTP 210 and fetched by CACE 202, received by CACE 202 in step 358 and processed by CACE in step 360. The part of the retrieved XML file shown in block 702 of FIG. 7A includes: the identifier of the gNB corresponding to the cell and radio for which radio configuration setting information is being requested by the CACE, which is GnbID=3811773, as shown in box 704, event=A3, as shown in box 706, and the value of parameter "Hysteresis"=0, as shown in box 708. Thus the CACE recovers information indicating that the current setting value of parameter 'Hysteresis" for the radio in the cell corresponding to GnbID=3811773 for event A3 is 0, as indicated by box 710.

Part B 703 of drawing 700, shown in FIG. 7B includes table 712 which is a representation of exemplary information extracted from an exemplary network operator 1 golden parameter list (GPL), e.g., corresponding to a particular radio type, and presented in the form of a network Control Platform (CP) display format. In some embodiments but not all embodiments the network control platform is an Airspan network Control Platform (ACP). The network operator 1 GPL is, e.g., the configuration setting file 410 obtained from the library database 230, which was requested by the CACE 202 in step 402 and received by the CACE 202 in step 412.

Column 714 indicates that the CP view is for a gNodeB parameter. Column 716 indicates that the CP main panel is NR Connected Mode Mobility. Column 718 indicates the CP subpanel is Report Configuration Table. Column 720 indicates that the parameter name is "Hysteresis". Column 722 indicates the parameter description: "This parameter used within entry and leave condition of an event triggered reporting condition. Column 724 indicates service impact="reboot required", indicating that this parameter cannot be changed on the fly without significant disruption to ongoing service being provided by the gNB, that a reboot of the radio and/or gNB is required when updating this parameter, and that this parameter should be updated, when an update is needed, during a convenient time interval which will not cause disruption to ongoing service being provided by the gNB, e.g. during a scheduled upcoming maintenance window for the cell corresponding to the gNB. Column 726 indicates that the allowable range for the parameter "Hysteresis" is 0 to 30. Column 728 indicates that the radio manufacturer default value for the parameter "Hysteresis" is 0. In some but not all embodiments, Airspan is the radio manufacturer. Column 730 indicates that the intended network operator 1 GPL setting value, for the radio type to which this GPL corresponds, is: 2 (for event A3) and is 2 (for event A5).

The CACE, e.g., CACE 202, extracts information from the received GPL file represented by table 712: parameter name "Hysteresis", as indicated by box 732, and value=2, as indicated by box 734, to obtain information 736 indicating that the intended network operator 1 GPL value for parameter 'Hysteresis" for event A3 is 2.

The CACE performs an audit, e.g., in step 414, and as part of the audit, the obtained current configuration setting for parameter 'Hysteresis" of block 710, which is 0, is compared to the intended network operator 1 setting for parameter 'Hysteresis' of block 736, which is 2. Thus, the audit detects a mismatch, and the CACE takes corrective action to update the configuration parameter 'Hysteresis" in the radio of the gNodeB with ID=3811773, e.g., to change the setting value from 0 to 2. In this example, the service impact indicator for the parameter 'Hysteresis' is 'reboot required', as shown in box 738; therefore, the CACE will identify a suitable maintenance window for the cell corresponding to the gNB and wait for the identified suitable maintenance window for the cell to occur before making the parameter update, and the parameter updating operation will involve a reboot of the radio and/or gNB.

Figure 8A:
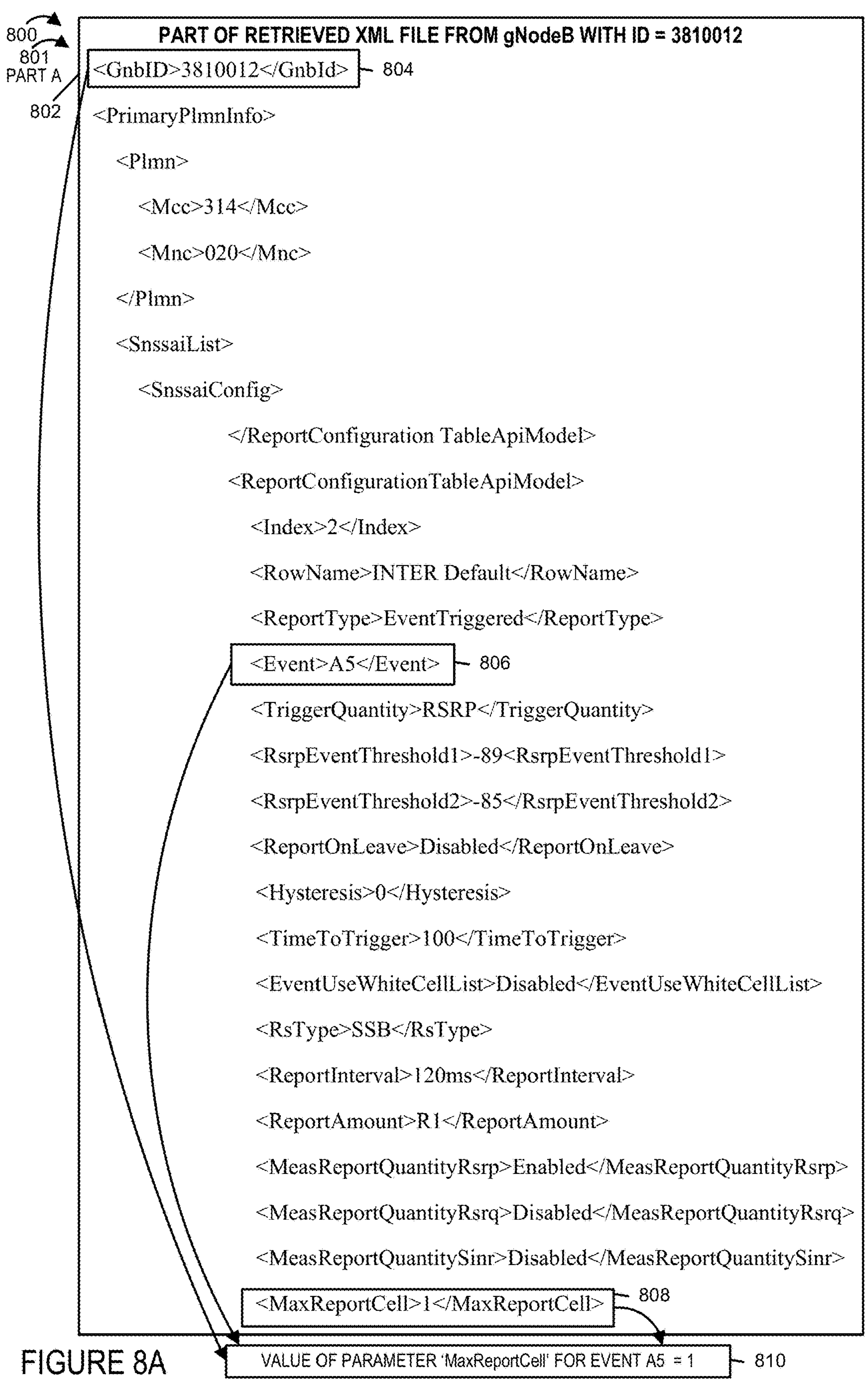
FIG. 8A illustrates a first part of an example depicting the difference in the parameter value of 'Max Report Cell' in an exemplary mobile network operator's Golden Parameter List (GPL) and in an XML corresponding to a particular GnbID, said difference to be detected by a CACE audit and automatically corrected, in accordance with an exemplary embodiment.
Figure 8B:
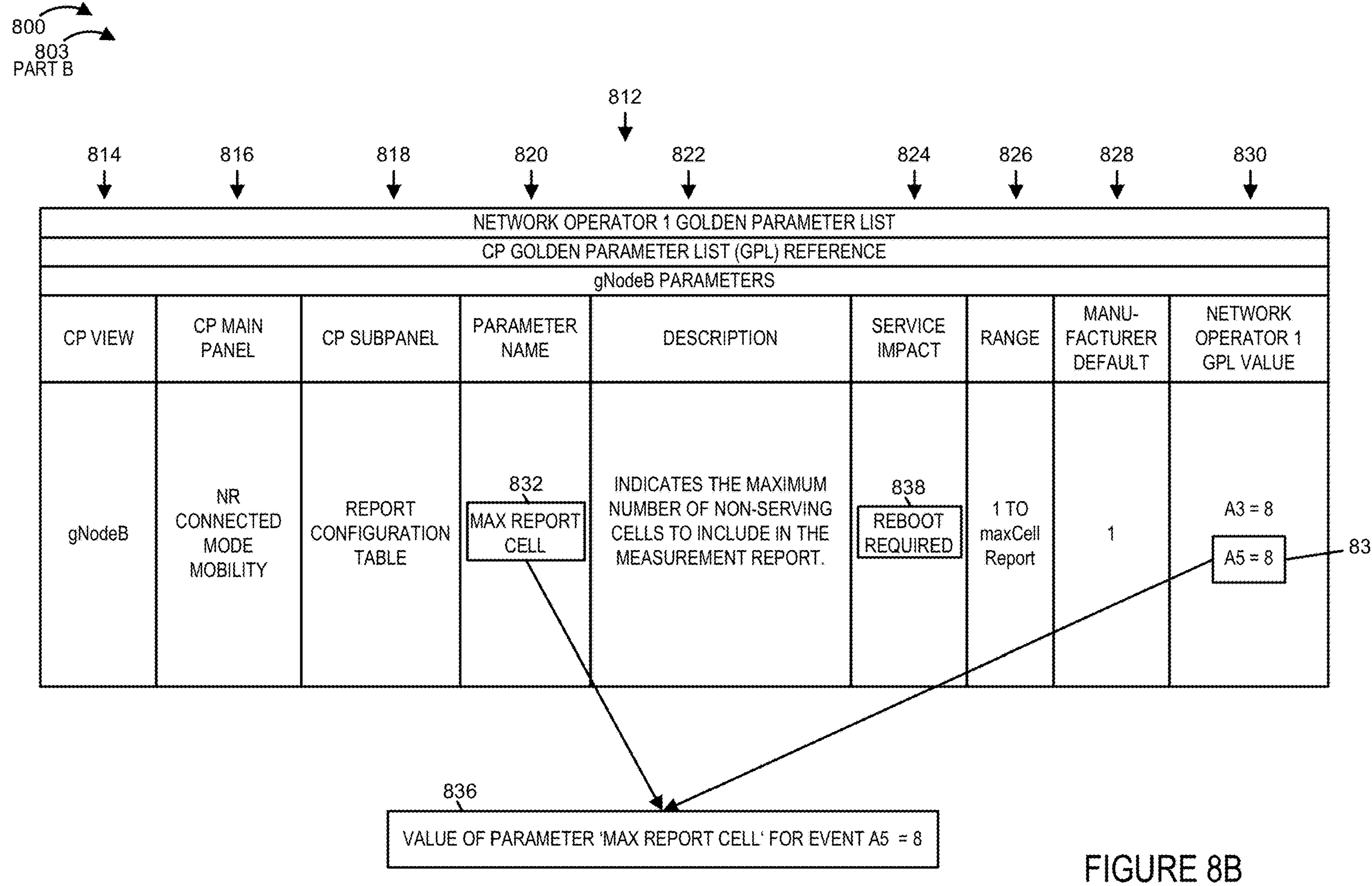
FIG. 8B illustrates a second part of an example depicting the difference in the parameter value of 'Max Report Cell' in an exemplary mobile network operator's Golden Parameter List (GPL) and an XML file corresponding to a particular GnbID, said difference to be detected by a CACE audit and automatically corrected, in accordance with an exemplary embodiment.

FIG. 8, comprising the combination of FIG. 8A and FIG. 8B, is a drawing 800 illustrating an example depicting the difference in the parameter value of 'Max Report Cell' in an exemplary mobile network operator's Golden Parameter List (GPL) and in an XML file corresponding to a particular GnbID, said difference to be detected by a CACE audit and automatically corrected, in accordance with an exemplary embodiment.

Part A 801 of drawing 800, shown in FIG. 8A includes block 802 which includes part of an exemplary retrieved XML file from an exemplary gNodeB with GnbID=3810012. The exemplary retrieved XML file is, e.g., XML file 328 which includes the radio configuration settings for the radio in gNodeB 212, which is stored by gNodeB 212 in SFTP 210 and fetched by CACE 202, received by CACE 202 in step 358 and processed by CACE in step 360. The part of the retrieved XML file shown in block 802 of FIG. 8A includes: the identifier of the gNB corresponding to the cell and radio for which radio configuration setting information is being requested by the CACE, which is GnbID=3810012, as shown in box 804, event=A5, as shown in box 806, and the value of parameter "MaxReportCell"=1, as shown in box 808. Thus, the CACE recovers information indicating that the current setting value of parameter 'MaxReportCell" for the radio in the cell corresponding to GnbID=3810012 for event A5 is 1, as indicated by box 810.

Part B 803 of drawing 800, shown in FIG. 8B includes table 812 which is a representation of exemplary information extracted from an exemplary network operator 1 golden parameter list (GPL), e.g., corresponding to a particular radio type, and presented in the form of a network Control Platform (CP) display format. The network operator 1 GPL is, e.g., the configuration setting file 410 obtained from the library database 230, which was requested by the CAC 202 in step 402 and received by the CACE 202 in step 412.

Column 814 indicates that the CP view is for a gNodeB parameter. Column 816 indicates that the CP main panel is NR Connected Mode Mobility. Column 818 indicates the CP subpanel is Report Configuration Table. Column 820 indicates that the parameter name is "MaxReportCell". Column 822 indicates the parameter description: "Indicates the maximum number of non-serving cells to include in the measurement report". Column 824 indicates service impact="reboot required", indicating that this parameter cannot be changed on the fly without significant disruption to ongoing service being provided by the gNB, that a reboot of the radio and/or gNB is required when updating this parameter, and that this parameter should be updated, when an update is needed, during a convenient time interval which will not cause disruption to ongoing service being provided by the gNB, e.g. during a scheduled upcoming maintenance window for the cell corresponding to the gNB. Column 826 indicates that the allowable range for the parameter “MaxReportCell” is 1 to maxCellReport. Column 828 indicates that the radio manufacturer default value for the parameter “MaxReportCell” is 1. Column 830 indicates that the intended network operator 1 GPL setting value, for the radio type to which this GPL corresponds, is: 8 (for event A3) and is 8 (for event A5).

The CACE, e.g., CACE 202, extracts information from the received GPL file represented by table 812: parameter name “MaxReportCell”, as indicated by box 832, and value=8, as indicated by box 834, to obtain information 836 indicating that the intended network operator 1 GPL value for parameter ‘MaxReportCell” for event A5 is 8.

The CACE performs an audit, e.g., in step 414, and as part of the audit, the obtained current configuration setting for parameter ‘MaxReportCell” of block 810, which is 1, is compared to the intended network operator 1 setting for parameter ‘MaxReportCell’ of block 836, which is 8. Thus, the audit detects a mismatch, and the CACE takes corrective action to update the configuration parameter ‘MaxReportCell” in the radio of the gNodeB with ID=3810012, e.g., to change the setting value from 1 to 8. In this example, the service impact indicator for the parameter ‘MaxReportCell’ is ‘reboot required’, as shown in box 838; therefore, the CACE will identify a suitable maintenance window for the cell corresponding to the gNB and wait for the identified suitable maintenance window for the cell to occur before making the parameter update, and the parameter updating operation will involve a reboot of the radio and/or gNB.

Figure 9:
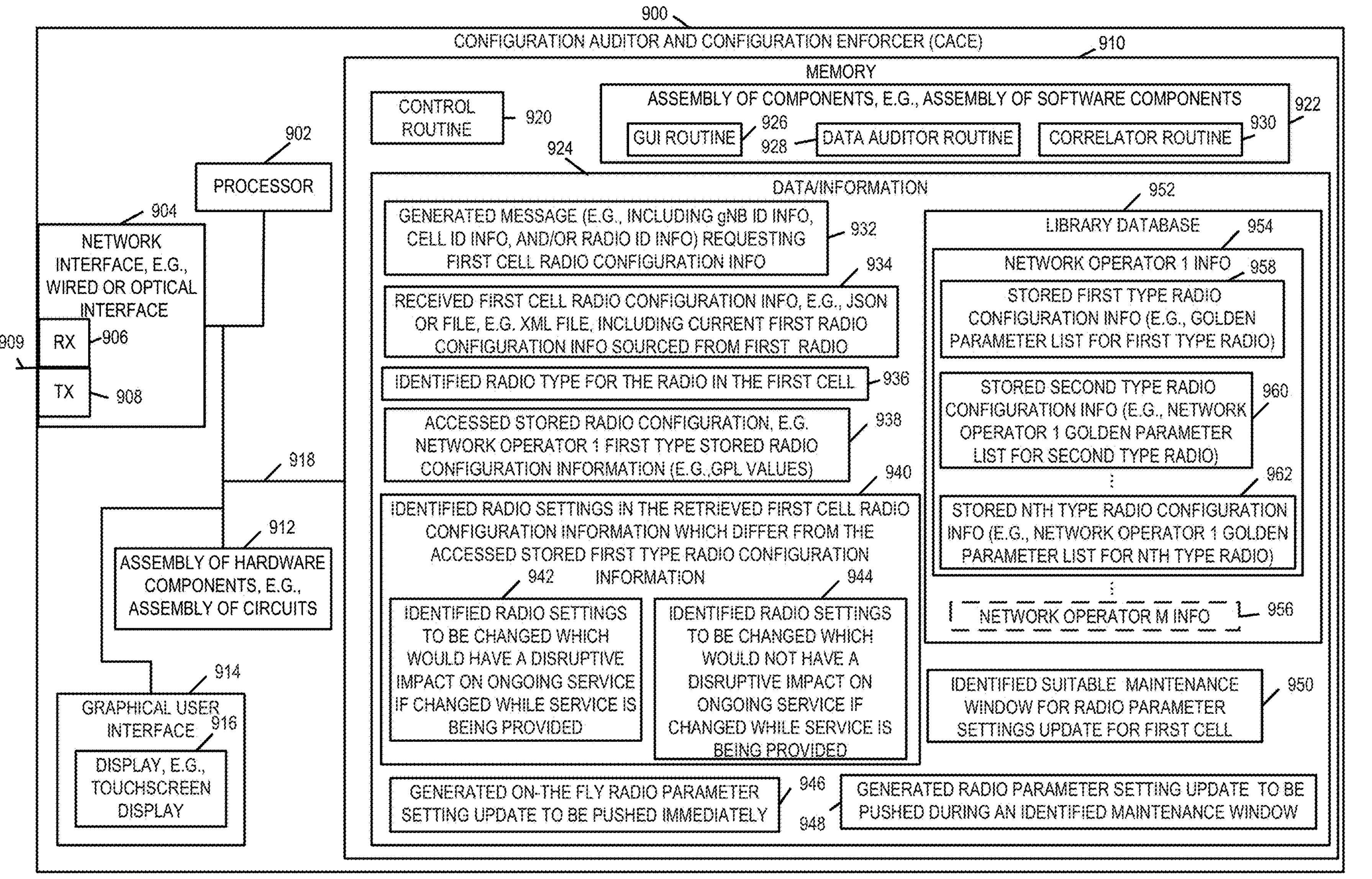
FIG. 9 is drawing of an exemplary Configuration Auditor and Configuration Enforcer (CACE) device in accordance with an exemplary embodiment.

FIG. 9 is a drawing of an exemplary Configuration Auditor and Configuration Enforcer (CACE) device 900 in accordance with an exemplary embodiment. Exemplary CACE 900 is, e.g., any of CACE 196 of system 100 of FIG. 1, CACE 202 of system 200 FIG. 2, CACE 202 of signaling diagram 300 of FIGS. 3, CACE 202 of signaling diagram 400 of FIG. 4, CACE 202 of signaling diagram 500 of FIG. 5, and/or a CACE implementing the method of flowchart 600 of FIG. 6. CACE 900 includes a processor 902, e.g., a CPU, a network interface 904, memory 910, assembly of hardware components 912, e.g., an assembly of circuits, and a graphical user interface (GUI) 914 coupled together via a bus 918 over which the various elements may interchange data and information.

Network interface 904, e.g., a wired or optical interface, includes a receiver 906 and a transmitter 908 coupled to connection 909, via with the CACE 900 is coupled to other devices, e.g., an OSS, an OSS database, core network nodes, a SFTP server, and/or the Internet. GUI 914 includes a display 916, e.g., a touchscreen display, via which an operator may input information and/or display results.

Memory 910 includes a control routine 920, an assembly of components 922, e.g., an assembly of software components, and data/information 924. Assembly of components 922 includes a GUI routine 926, a data auditor routine 928 and a correlator routine 930. Control routine 920 includes instructions, which when executed by processor 902 control the CACE 900 to perform basic device operational functions such as, e.g., controlling the network interface 904, accessing memory 910, storing in memory 910, etc. Assembly of components 922, e.g., an assembly of software components, includes instructions, which when executed by processor 902 control the CACE 900 to implement steps of a method, e.g., steps of the method of signaling diagrams (300, 400, 500) of FIGS. 3, 4, 5), respectively which are performed by CACE 202, and/or steps of the method of flowchart 600 of FIG. 6. GUI routine 920 includes instructions, which when executed by processor 902 control the CACE 900 to operate the GUI 914, e.g., providing results of an automatic cell configuration setting audit and results of automatic updates to a system administrator. Data auditor routine 928 includes instructions, which when executed by processor 902 control the CACE 900 to perform cell configuration radio setting auditing operations, e.g., acquiring cell radio configuration information (e.g., a JSON or a file including current radio configuration settings corresponding to particular gNB, radio, and cell; and a golden parameter list (GPL) corresponding to a radio type in a network) to compare; comparing the acquired information; identifying any discrepancies, and generating updates to correct any mismatches in parameter values. Correlator routine 930 instructions, which when executed by processor 902 control the CACE 900 to perform correlation operations, e.g., identifying the radio type of the radio in the cell being audited, identifying which of a plurality of different sets of stored radio configuration information (which of the plurality of different stored GPL files including intended parameter values) is to be accessed, different sets of stored radio configuration information corresponding to different radio types in a network, and identifying whether a parameter that needs to be updated is to updated on the fly (e.g., immediately) or during a maintenance window (e.g., involving a radio and/or base station reboot), and identifying one or more upcoming maintenance windows corresponding to a particular cell.

Data/information 924 includes a generated message (e.g., including gNB ID information, cell ID information and/or radio ID information, e.g., a radio S/N or a S/N of the gNB including the radio) requesting first cell radio configuration information 932, received first cell radio configuration information, e.g., a JSON or file, e.g., an XML file, including current first radio configuration information sourced from the first radio 934, an identified radio type for the radio in the first cell 936, accessed stored radio configuration 938, e.g. network operator 1 first type stored radio configuration information, e.g., intended GPL values to be used by the first radio, identified radio setting in the retrieved first cell radio configuration information which differ from the accessed stored first type radio configuration information 940, e.g. results of an audit. Information 940 includes identified radio settings to be changed which would have a disruptive impact on ongoing service if changed while service is being provided 942 and identified radio settings to be changed which would not have a disruptive impact on ongoing service if changed while service is being provided.

Data/information 924 further includes a generated on the fly radio parameter setting update to be pushed immediately 946 and a generated radio parameter setting update to be pushed during an identified maintenance window 948, and an identified suitable maintenance window for a radio parameter settings update for the first cell 950.

Data/information 948 further includes a library database 952. Library database 952 includes network operator information corresponding to one or more network operators (network operator 1 information 954, . . . , network operator M information. Network operator 1 information 952 includes a plurality of sets of radio configuration information (stored first type radio configuration information 958, e.g., a golden parameter list for a first type radio including a set of intended golden parameter values to be installed and used in a first type radio, stored second type radio configuration information 960, e.g., a golden parameter list for a second type radio including a set of intended golden parameter values to be installed and used in a second type radio, . . . , stored Nth type radio configuration information 962, e.g., a golden parameter list for a Nth type radio including a set of intended golden parameter values to be installed and used in an Nth type radio). In one example, the first type radio is a macro cell radio included in macro cell base station, the second type radio is a femto cell radio included in a femto cell base station and the Nth type radio is a pico/micro cell radio included in a pico/micro cell base station.

Figure 10:
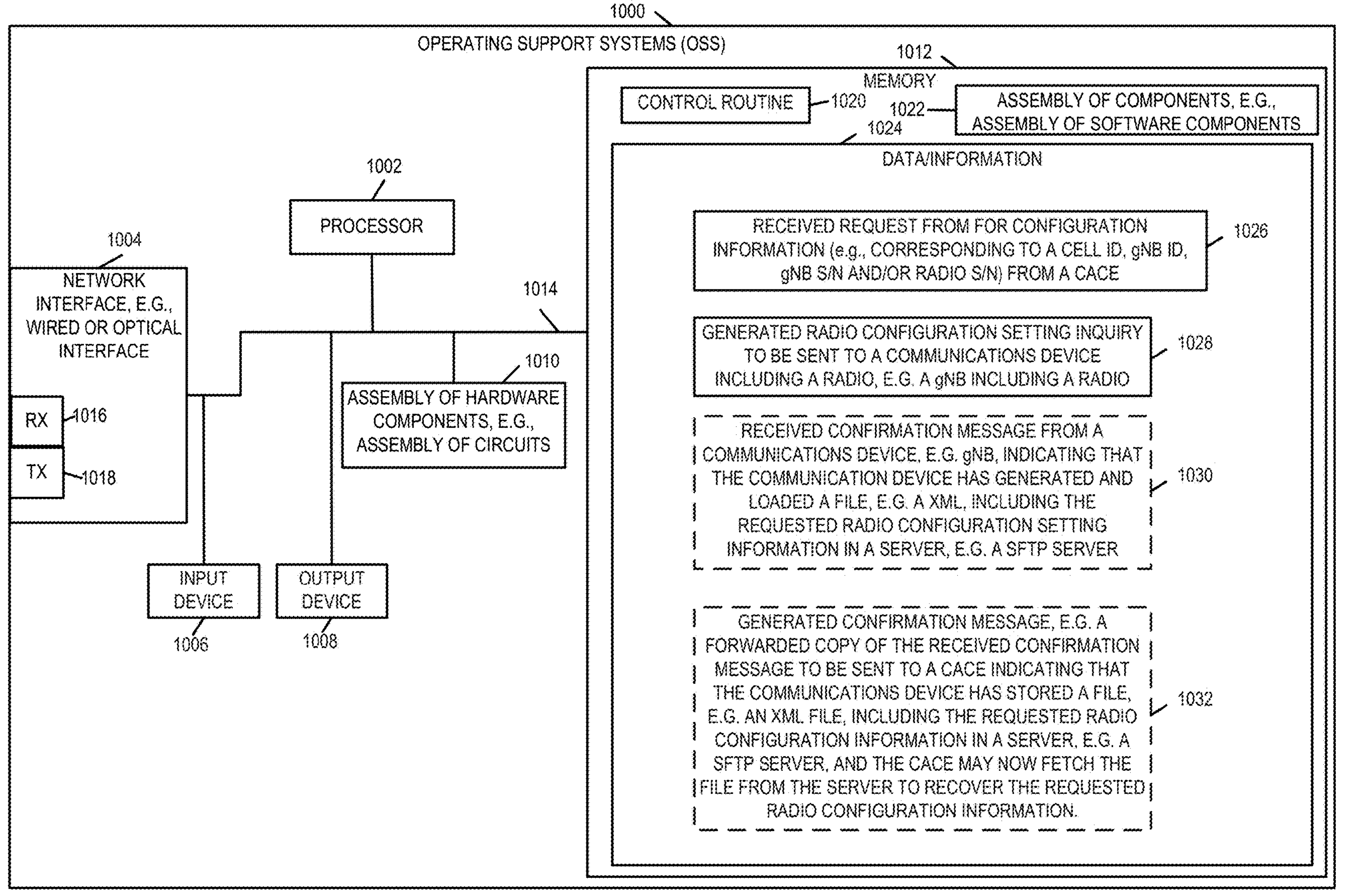
FIG. 10 is a drawing of an exemplary Operations Support Systems (OSS) in accordance with an exemplary embodiment.

FIG. 10 is a drawing of an exemplary Operations Support Systems (OSS) 1000 in accordance with an exemplary embodiment. OSS 1000 is, e.g., any of OSS 190 of system 100 FIG. 1, OSS 232 of system 200 of FIG. 2, OSS 232 of signaling diagram 300 of FIG. 3, OSS 232 of signaling diagram 500 of FIG. 5, and/or a OSS implementing operations described or shown with respect to the method of flowchart 600 of FIG. 6. OSS 1000 includes a processor 1002, e.g., a CPU, a network interface 1004, e.g., a wired or optical interface, an input device 1006, e.g., a keyboard and/or mouse, an output device 1008, e.g., a display, an assembly of hardware components 1010, e.g., an assembly of circuits, and memory 1012 coupled together via a bus 1014 over which the various elements may interchange data and information.

Network interface 1004, e.g., a wired or optical interface, includes receiver 1016 and transmitter 1018. OSS 1000 is coupled to other devices, e.g., a CACE device, an OSS database, core network nodes, an SFTP server, and/or the Internet via network interface 1004.

Memory 1012 includes control routine 1020, assembly of components 1022, e.g., an assembly of software components, and data/information 1024. Control routine 1020 includes instructions, which when executed by processor 1002 control the OSS 1000 to perform basic device operational functions such as, e.g., controlling the network interface 1004, controlling input device 1006, controlling output device 1008, accessing memory 1012, storing in memory 1012, etc. Assembly of components 1022, e.g., an assembly of software components, includes instructions, which when executed by processor 1002 control the OSS 1000 to implement steps of a method, e.g., steps of the signaling diagrams (300, 400, 500) of FIGS. (3, 4, 5) which are performed by OSS 232 and/or operations performed by an OSS which are described or shown with respect to flowchart 600 of FIG. 6.

Data information 1024 includes a received request 1026 for configuration information (e.g., corresponding to a cell ID, a gNB ID, a gNB S/N and/or a radio S/N) from a CACE, and a generated radio configuration setting inquiry 1028 to be sent to a communications device including a radio, e.g., the gNB including the radio for which the current radio configuration setting information is being requested, said radio configuration setting inquiry 1028 being generated and sent in response to said received request 1026 for configuration information. In some embodiments, data/information 1024 includes a received confirmation message 1030 from a communications device, e.g., a gNB, indicating that the communications device has generated and loaded a file, e.g., and XML file, included the requested radio configuration setting information in a server, e.g., a SFTP server, and a generated confirmation message 1032, e.g., a forwarded copy of the received confirmation message, to be sent to a CACE indicating that the communications device, e.g. gNB, has stored a file, e.g., an XML file, including the requested radio configuration information in a server, e.g., a SFTP server, and the CACE may now fetch the file from the server and recover the requested radio configuration information.

Figure 11:
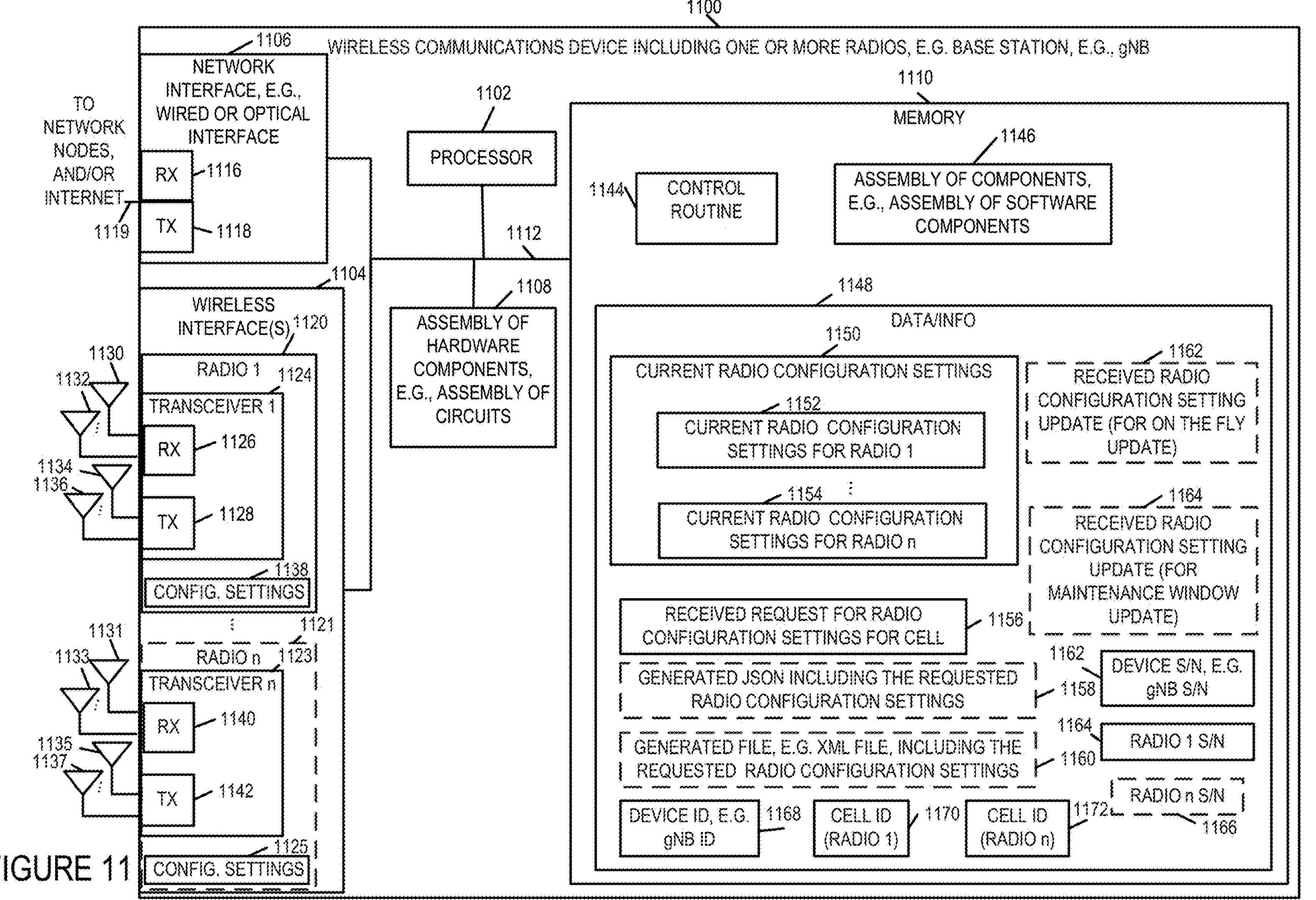
FIG. 11 is a drawing of an exemplary wireless communications device including a radio, e.g., a base station such as a gNB including a radio, in accordance with an exemplary embodiment.

FIG. 11 is a drawing of an exemplary wireless communications device 1100 including a radio, e.g., a base station such as a gNB including a radio, in accordance with an exemplary embodiment. Exemplary wireless communication device 1100 is, e.g., any of macro cell base station 102 of FIG. 1, femto cell base station 110 of FIG. 1, pico/micro cell base station 112 of FIG. 1, WiFi AP 114 of FIG. 1, WiFi small cell AP 116 of FIG. 1, RRH/DAS 118 of FIG. 1, relay station 120 of FIG. 1, wireless communications device 212 of FIG. 2, wireless communications device N 214 of FIG. 2, gNB 212 of FIG. 3 and FIG. 5, and/or a wireless communications device, e.g., a gNB described with respect to the method of flowchart 600 of FIG. 6.

Wireless communications device 1100, e.g., a gNodeB base station including one or more radios, includes processor 1102, e.g., a CPU, wireless interface(s) 1104, network interface 1106, assembly of hardware components 1108, e.g., assembly of circuits, and memory 1110 coupled together via bus 1112 over which the various elements may interchange data and information.

Memory 1110 includes control routine 1144, assembly of components 1146, e.g., an assembly of software components, and data/information 1148. Control routine 1144 includes instructions, which when executed by processor 1102 control the wireless communications device 1100 to perform basic device operational functions such as, e.g., controlling the network interface 1106, controlling wireless interfaces 1104, accessing memory 1110, storing in memory 1110, etc. Assembly of components 1146, e.g., an assembly of software components, includes instructions, which when executed by processor 1102 control the wireless communications device to implement steps of a method, e.g., steps of the signaling diagrams (300, 400, 500) of FIGS. 3, 4, 5), respectively, which are performed by gNodeB 212, and/or operations performed by a wireless communications device, e.g. a gNB, which are described or shown with respect to flowchart 600 of FIG. 6.

Wireless interface(s) 1104 includes one or more radios (radio 1 1120, . . . , radio n 1122). Radio 1 1120 includes transceiver 1 1124 and configuration settings 1138, e.g., radio 1 configuration settings. Transceiver 1 1124 includes receiver 1126 and transmitter 1128. Receiver 1126 is coupled to one or more receive antennas or antenna elements (1130, . . . , 1132) via which the wireless communications device 1100 receives wireless signals, e.g., from UEs. Transmitter 1128 is coupled to one or more transmit antennas or antenna elements (1134, . . . , 1136) via which the wireless communications device 1100 transmits wireless signals, e.g., to UEs.

Radio n 1122 includes transceiver n 1123 and configuration settings 1125, e.g., radio n configuration settings. Transceiver n 1123 includes receiver 1140 and transmitter 1142. Receiver 1140 is coupled to one or more receive antennas or antenna elements (1131, . . . , 1133) via which the wireless communications device 1100 receives wireless signals, e.g., from UEs. Transmitter 1142 is coupled to one or more transmit antennas or antenna elements (1135, . . . , 1137) via which the wireless communications device transmits wireless signals, e.g., to UEs.

Data/information 1148 includes current radio configuration settings 1150 including current radio configuration settings for each radio in wireless communications device 1100 (current radio configuration settings for radio 1 1152, . . . , current radio configuration settings for radio n 1154), a received request for radio configuration setting for cell 1156, and one of a generated JSON including the requested radio configuration settings 1158, e.g., to be communicated directed to the CACE, or a generated file, e.g. an XML file, including the requested radio configuration settings 1160, e.g., to be communicated to a SFTP server to be stored and subsequently communicated to the CACE, e.g., in response to a fetch request.

Data/information 1148 further includes one or both of: i) a received radio configuration setting update 1162, communicated from a CACE in response to a completed audit of radio configuration settings, said received radio configuration setting update 1162 to be installed on the fly, e.g., immediately in the wireless communications device 1100, ii) a received radio configuration setting update 1164, communicated from a CACE in response to a completed audit of radio configuration settings, said received radio configuration setting update 1164 to be installed during a maintenance window for the cell, e.g. which includes a reboot of the radio and/or base station. Data/information 1148 further includes a device S/N 1162, e.g., a gNB S/N, a radio 1 S/N 1164, a radio n S/N 1166, a device ID 1168, e.g., a gNB ID, a cell ID 1170 (corresponding to cell for radio 1), and a cell ID 1172 (corresponding to the cell for radio n).

Figure 12:
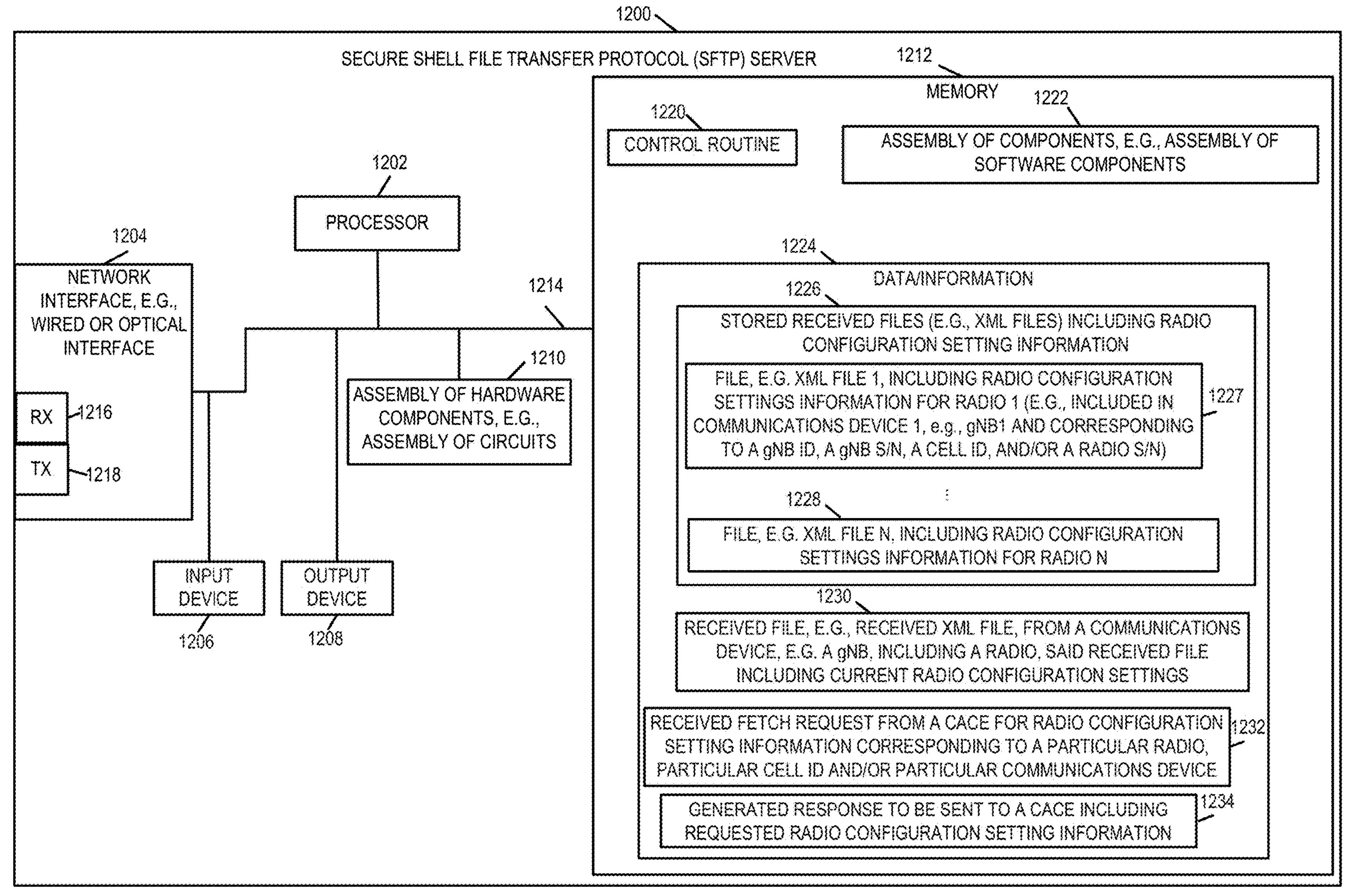
FIG. 12 is a drawing of an exemplary secure shell file transfer protocol (SFTP) server in accordance with an exemplary embodiment.

FIG. 12 is a drawing of an exemplary secure shell file transfer protocol (SFTP) server 1200 in accordance with an exemplary embodiment. Exemplary SFTP server 1200 is, e.g., any of SFTP server 194 of system 100 of FIG. 1, SFTP server 210 of system 200 FIG. 2, SFTP 210 of signaling diagram 300 of FIG. 3, and/or a SFTP described with respect to the method of flowchart 600 of FIG. 6. SFTP server 1200 includes a processor 1202, e.g., a CPU, a network interface 1204, e.g., a wired or optical interface, an input device 1206, e.g., a keyboard or mouse, an output device 1208, e.g., a display, an assembly of hardware components 1210, e.g., an assembly of circuits, and memory 1212 coupled together via a bus 1214 over which the various elements may interchange data and information.

Network interface 1204 includes a receiver 1216 and a transmitter 1218. SFTP server 1200 receives, via receiver 1216, files, e.g., an XML file from a wireless communications device including a radio, e.g., gNB base station, said received XML file including radio configuration setting information. SFTP server 1200 also receives, via receiver 1216, a fetch request for a stored file, e.g., a stored XML file including radio configuration settings for a particular radio included in a gNB which corresponds to a cell ID. SFTP server 1200 sends, via transmitter 1218, a response including a file, e.g., an XML file including radio configuration setting information to a CACE.

Memory 1212 includes a control routine 1220, an assembly of circuits 1222, e.g., an assembly of software components, and data/information 1224. Control routine 1220 includes instructions, which when executed by processor 1202 control the SFTP server 1200 to perform basic device operational functions such as, e.g., controlling the network interface 1204, controlling input device 1206, controlling output device 1208, accessing memory 1212, storing in memory 1212, etc. Assembly of components 1222, e.g., an assembly of software components, includes instructions, which when executed by processor 1202 control the server 1200 to implement steps of a method, e.g., steps of the signaling diagram of FIGS. 3, 4, 5 which are performed by SFTP server 210, and/or operations performed by a server, which are described or shown with respect to flowchart 600 of FIG. 6.

Data/information 1224 includes stored received files 1226, e.g., stored received XML files, including radio configuration setting information, a received file 1230, e.g., a received XML file, from a communications device, e.g., a gNB, including a radio, said received file including current radio configuration settings, a received fetch request from a CACE for radio configuration setting information corresponding to a particular radio, particular cell ID and/or particular communications device 1232, and a generated response including radio configuration setting information to be sent to a CACE 1234. Stored received files 1226 including radio configuration setting information includes a plurality of files (file 1 1227, e.g., XML file 1, including radio configuration setting information for radio 1 (e.g., included in communications device 1, e.g., gNB1, and corresponding to a gNB ID, a gNB S/N, a cell ID, and/or a radio S/N), . . . , file N 1228, e.g., XML file N, including radio configuration setting information for radio N (e.g., included in communications device N, e.g., gNBN, and corresponding to a gNB ID, a gNB S/N, a cell ID, and/or a radio S/N).

Figure 13:
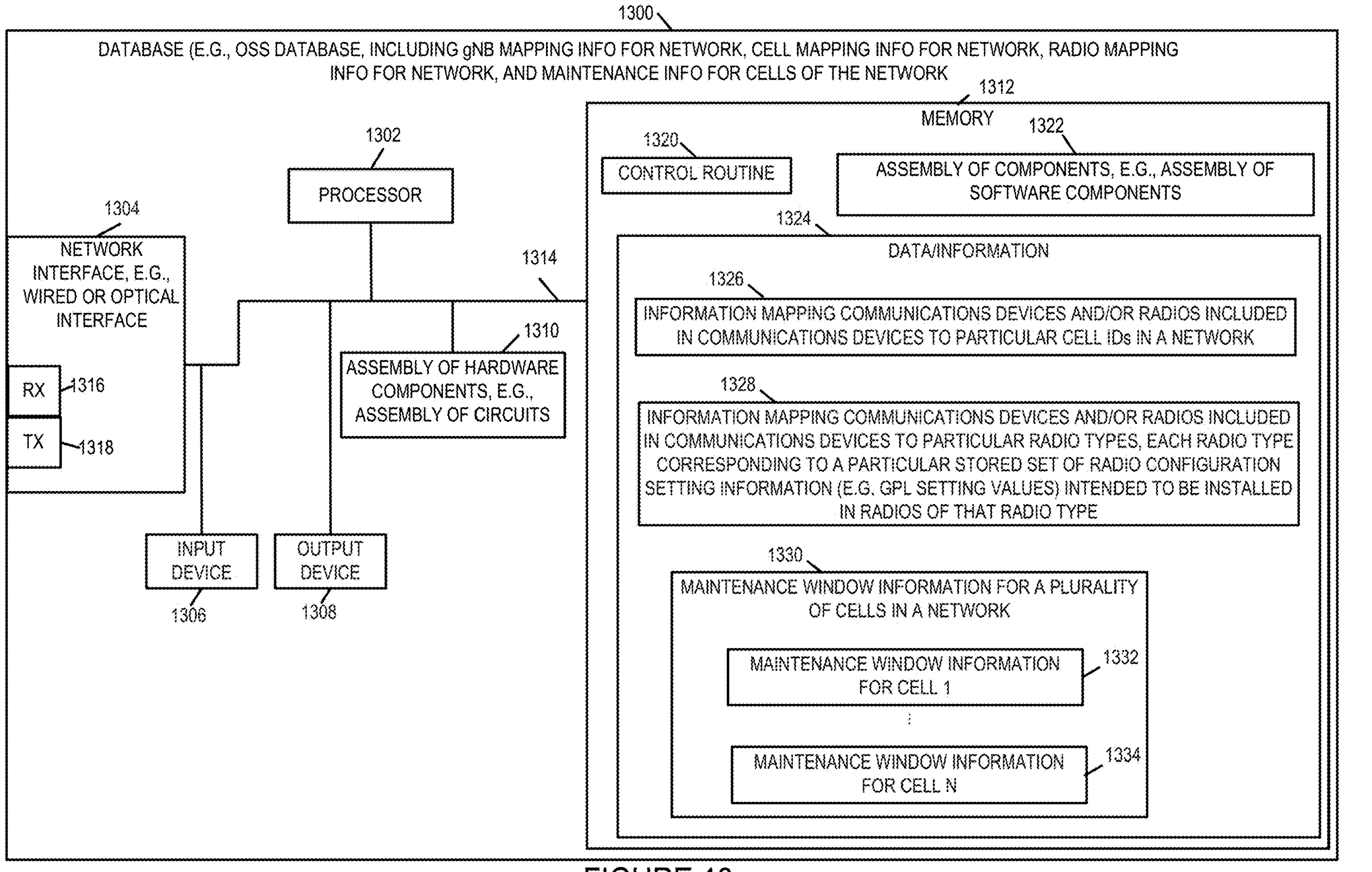
FIG. 13 is a drawing of an exemplary database, e.g., an OSS database, in accordance with an exemplary embodiment.

FIG. 13 is a drawing of an exemplary database 1300, e.g., an OSS database including gNB mapping information for a network, cell mapping information for the network, radio mapping information for the network, and maintenance information for cells in the network, in accordance with an exemplary embodiment. Exemplary database 1300 is, e.g., any of database 192 of system 100 of FIG. 1, database 233 of system 200 FIG. 2, database 233 of signaling diagram 500 of FIG. 5, and/or a database described with respect to the method of flowchart 600 of FIG. 6. Database 1300 includes a processor 1302, e.g., a CPU, a network interface 1304, e.g., a wired or optical interface, an input device 1306, e.g., a keyboard or mouse, an output device 1308, e.g., a display, an assembly of hardware components 1310, e.g., an assembly of circuits, and memory 1312 coupled together via a bus 1314 over which the various elements may interchange data and information.

Network interface 1304 includes a receiver 1316 and a transmitter 1318. Database 1300 communicates with an OSS, a CACE and/or other devices, via network interface 1304 and/or the Internet. Memory 1312 includes a control routine 1320, an assembly of circuits 1322, e.g., an assembly of software components, and data/information 1324. Data/information 1324 includes information 1326 mapping communications devices and/or radio(s) included in communications devices to particular cells and/or cell IDs in a network, and information 1328 mapping communications devices and/or radios included in communications devices to particular radio types, each radio type corresponding to a particular stored set of radio configuration setting information (e.g., GPL setting values) intended to be installed in radios of that radio type. Communications devices and/or radios in a network can be, and sometimes are identified by one or more device identifiers, e.g., a gNB ID, a cell ID, and/or one or more device S/Ns, e.g., a gNB S/N, a radio S/N. In some embodiments, in which a single radio is included as integral part of a communications device, e.g., a base station, the S/N of the base station is used to identify the radio included in the base station. Data/information 1324 further includes maintenance window information 1330 for a plurality of cells in a network (maintenance window information for cell 1 1332, . . . , maintenance window information for cell N 1334. Each set of maintenance window information, e.g., information 1332, includes information specifying when one or more scheduled maintenance windows are to occur for the cell and the duration of each scheduled maintenance window. Maintenance window information is used by a CACE in identifying a suitable maintenance window for a radio configuration setting update for a radio corresponding to particular cell for which the update involves a reboot operation of the radio and/or communications device.

Figure 14:
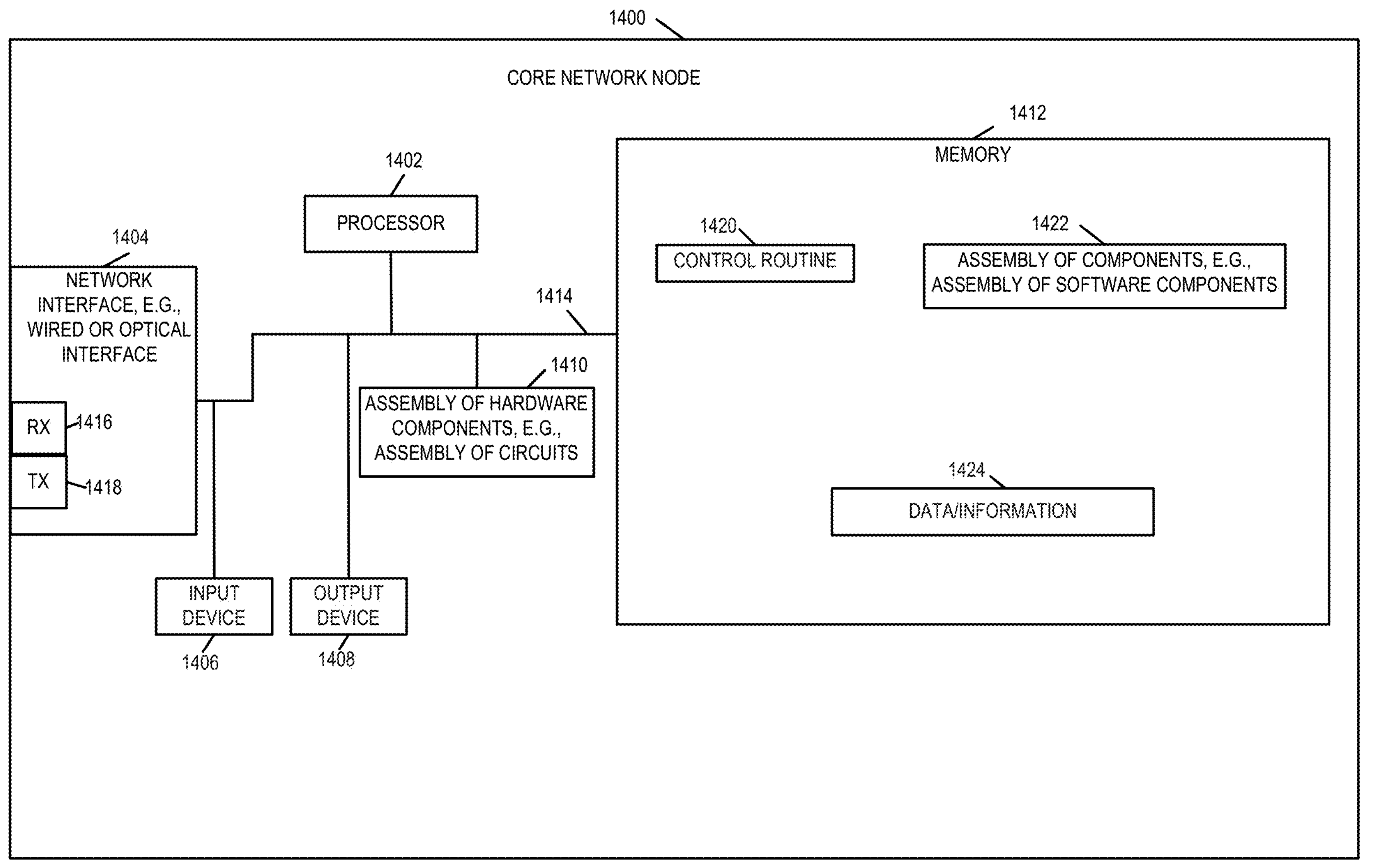
FIG. 14 is a drawing of an exemplary core network node in accordance with an exemplary embodiment.

FIG. 14 is a drawing of an exemplary core network node 1400 in accordance with an exemplary embodiment. Exemplary core network node is, e.g., a node implementing one or more of the core network functions, e.g., of core network 106 of system 100 of Figure or of 5G core network 206 of system 200 of FIG. 2.

Core network node 1400 includes a processor 1402, e.g., a CPU, a network interface 1404, e.g., a wired or optical interface, an input device 1406, e.g., a keyboard or mouse, an output device 1408, e.g., a display, an assembly of hardware components 1410, e.g., an assembly of circuits, and memory 1412 coupled together via a bus 1414 over which the various elements may interchange data and information. Network interface 1404 includes a receiver 1416 and a transmitter 1418. Core network node 1400 communicates with an OSS, a CACE, various databases, servers, communications devices including radios, e.g., gNBs, access points, etc., other network nodes and/or other devices, data networks, and/or the Internet via network interface 1404. Memory 1412 includes a control routine 1420, an assembly of circuits 1422, e.g., an assembly of software components, and data/information 1424.

Figure 15:
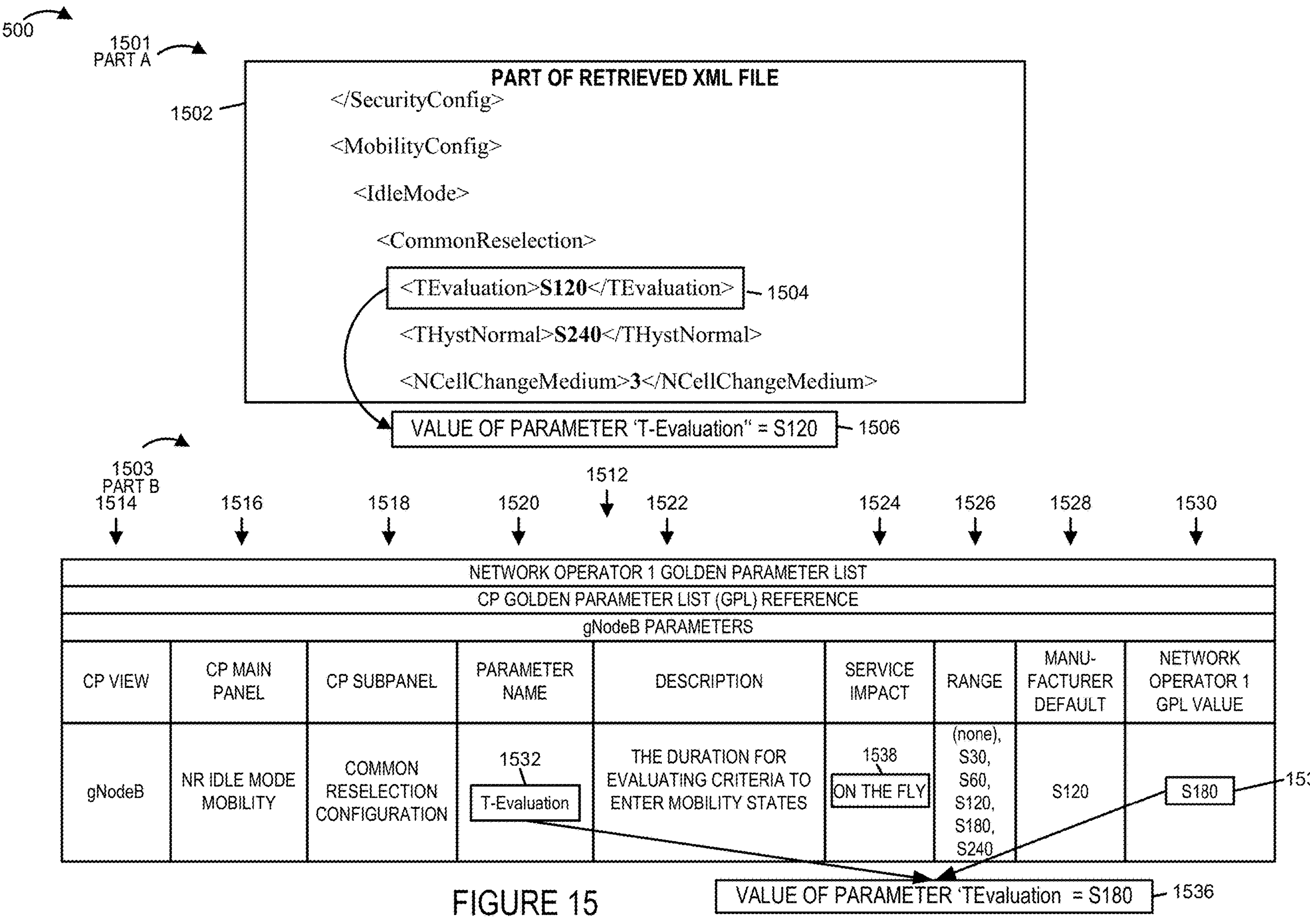
FIG. 15 illustrates an example depicting the difference in the parameter value of 'TEvaluation' in an XML file corresponding to particular gNB including a radio and in an exemplary mobile network operator's Golden Parameter List (GPL), said difference being detected by a CACE audit and automatically corrected (updated) on-the fly, in accordance with an exemplary embodiment.

FIG. 15 illustrates an example depicting the difference in the parameter value of 'TEvaluation' in an XML file corresponding to particular gNB including a radio and in an exemplary mobile network operator's Golden Parameter List (GPL), said difference being detected by a CACE audit and automatically corrected (updated) on-the fly, in accordance with an exemplary embodiment.

Part A 1501 of drawing 1500 of FIG. 15 includes block 1502 which includes part of an exemplary retrieved XML file from an exemplary gNodeB including a radio. The exemplary retrieved XML file is, e.g., XML file 328 which includes the radio configuration settings for the radio in gNodeB 212, which is stored by gNodeB 212 in SFTP 210 and fetched by CACE 202, received by CACE 202 in step 358 and processed by CACE in step 360. The part of the retrieved XML file shown in block 1502 of FIG. 15 includes: the value of parameter "TEvaluation"=S120, as shown in box 1504. Thus the CACE recovers information indicating that the current setting value of parameter 'TEvaluation" for the radio in the cell corresponding to gNB is S120 (representing 120 seconds), as indicated by box 1506.

Part B 1503 of drawing 1500, shown in FIG. 15 includes table 1512 which is a representation of exemplary information extracted from an exemplary network operator 1 golden parameter list (GPL), e.g., corresponding to a particular radio type, and presented in the form of a network Control Platform (CP) display format. The network operator 1 GPL is, e.g., the configuration setting file 410 obtained from the library database 230, which was requested by the CACE 202 in step 402 and received by the CACE 202 in step 412.

Column 1514 indicates that the CP view is for a gNodeB parameter. Column 1516 indicates that the CP main panel is NR Idle Mode Mobility. Column 1518 indicates the CP subpanel is common reselection configuration. Column 1520 indicates that the parameter name is "T-Evaluation". Column 1522 indicates the parameter description: "The duration for evaluating criteria to enter mobility states". Column 1524 indicates service impact="on the fly", indicating that the parameter can be changed on the fly without significant disruption to ongoing service being provided by the gNB. Column 1526 indicates that the allowable range for the parameter "T-Evaluation" is: (none), S30, S60, S120, S180, S140. Column 1528 indicates that the radio manufacturer default value for the parameter "T-Evaluation" is S120. Column 1530 indicates that the intended network operator 1 GPL setting value, for the radio type to which this GPL corresponds, is: S180 (representing 180 seconds).

The CACE, e.g., CACE 202, extracts information from the received GPL file represented by table 1512: parameter name "T-Evaluation", as indicated by box 1532, and value=S180, as indicated by box 1534, to obtain information 1536 indicating that the intended network operator 1 GPL value for parameter 'T-Evaluation" is S180.

The CACE performs an audit, e.g., in step 414, and as part of the audit, the obtained current configuration setting for parameter "T-Evaluation" of block 1506, which is S120, is compared to the intended network operator 1 setting for parameter T-Evaluation' of block 1536, which is $180. Thus, the audit detects a mismatch, and the CACE takes corrective action to update the configuration parameter "T-Evaluation" in the radio of the gNodeB, e.g., to change the setting value from S120 to S180. In this example, the service impact indicator for the parameter "T-Evaluation" is 'on the fly', as shown in box 1538; therefore, the CACE can update this parameter immediately without having to wait for a suitable maintenance window for the cell.

Figure 16A:
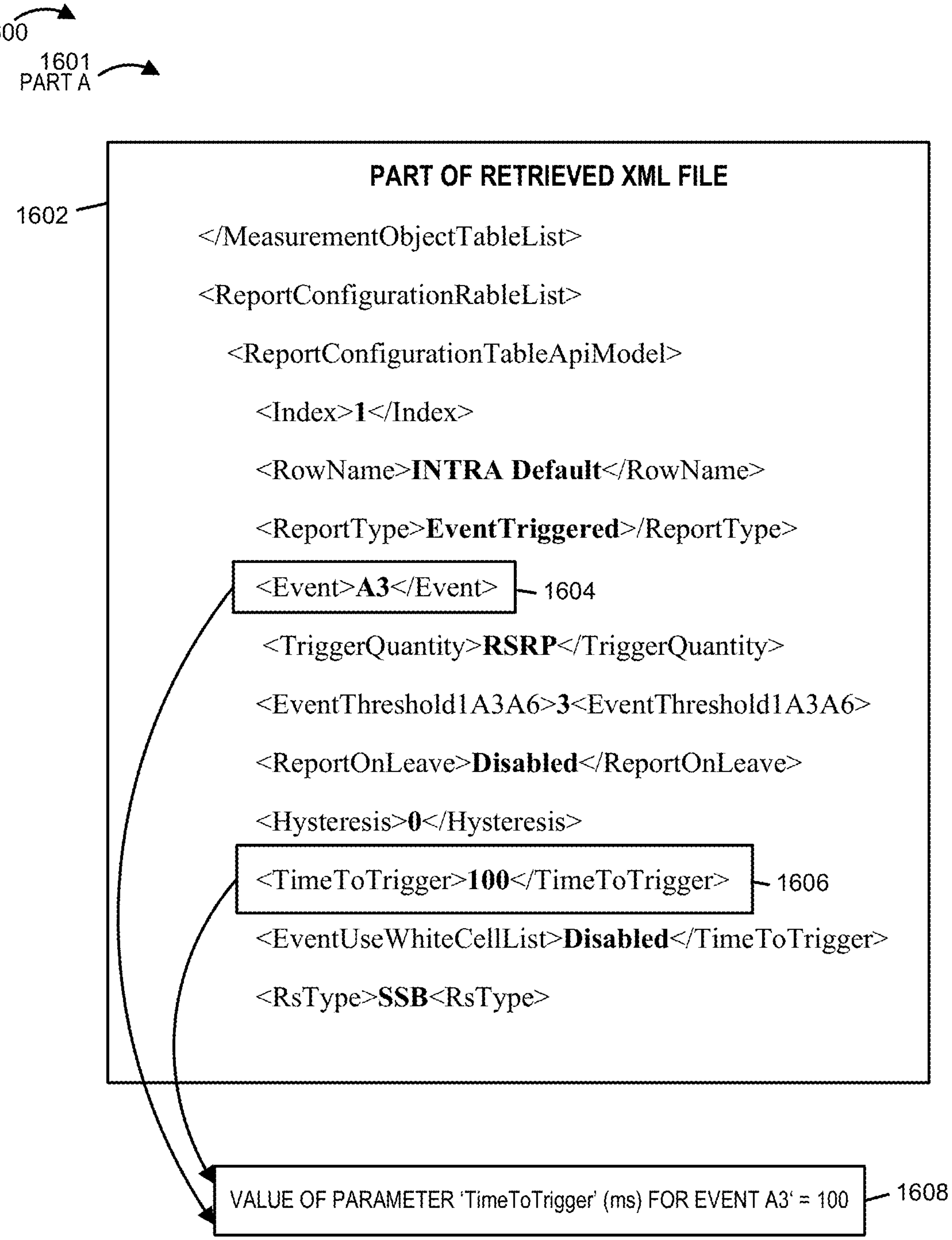
FIG. 16A illustrates a first part of an example depicting the difference in the parameter value of 'TimeToTrigger' in an XML file corresponding to particular gNB including a radio and in an exemplary mobile network operator's Golden Parameter List (GPL), said difference being detected by a CACE audit and automatically corrected (updated) on-the fly, in accordance with an exemplary embodiment.
Figure 16B:
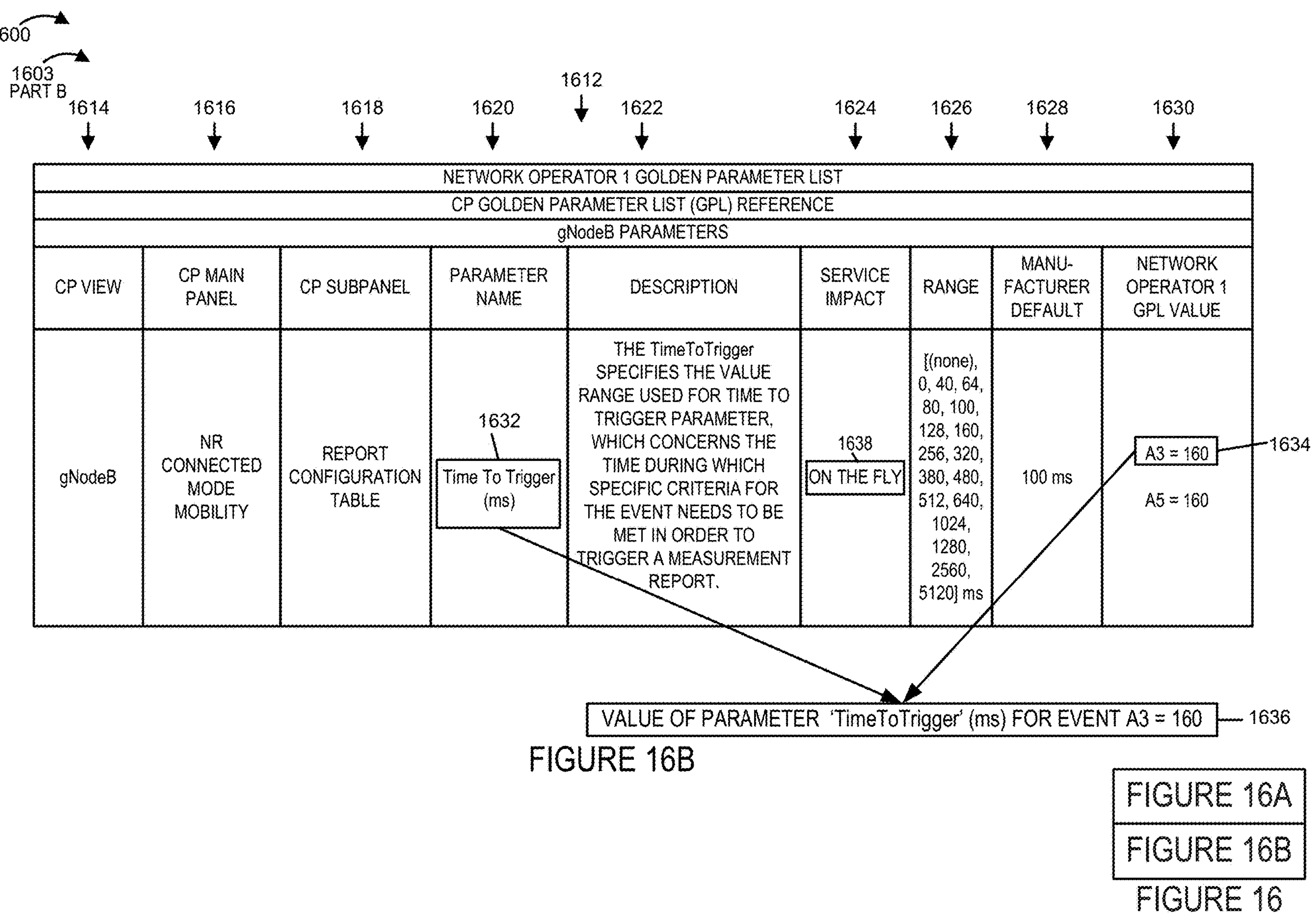
FIG. 16B illustrates a second part of an example depicting the difference in the parameter value of 'TimeToTrigger' in an XML file corresponding to particular gNB including a radio and in an exemplary mobile network operator's Golden Parameter List (GPL), said difference being detected by a CACE audit and automatically corrected (updated) on-the fly, in accordance with an exemplary embodiment.

FIG. 16 comprising the combination of FIG. 16A and FIG. 16B illustrates an example depicting the difference in the parameter value of 'TimeToTrigger' in an XML file corresponding to particular gNB including a radio and in an exemplary mobile network operator's Golden Parameter List (GPL), said difference being detected by a CACE audit and automatically corrected (updated) on-the fly, in accordance with an exemplary embodiment.

Part A 1601 of drawing 1600 shown in FIG. 16A includes block 1602 which includes part of an exemplary retrieved XML file from an exemplary gNodeB including a radio. The exemplary retrieved XML file is, e.g., XML file 328 which includes the radio configuration settings for the radio in gNodeB 212, which is stored by gNodeB 212 in SFTP 210 and fetched by CACE 202, received by CACE 202 in step 358 and processed by CACE in step 360. The part of the retrieved XML file shown in block 1602 of FIG. 16 includes: Event=A3, as shown in block 1604 and the value of parameter "TimeToTrigger"=100, as shown in box 1606. Thus the CACE recovers information indicating that the current setting value of parameter 'TimeToTrigger" for the radio in the cell corresponding to gNB for Event A3 is 100 (ms), as indicated by box 1608.

Part B 1603 of drawing 1600, shown in FIG. 16B includes table 1612 which is a representation of exemplary information extracted from an exemplary network operator 1 golden parameter list (GPL), e.g., corresponding to a particular radio type, and presented in the form of a network Control Platform display format. The network operator 1 GPL is, e.g., the configuration setting file 410 obtained from the library database 230, which was requested by the CACE 202 in step 402 and received by the CACE 202 in step 412.

Column 1614 indicates that the CP view is for a gNodeB parameter. Column 1616 indicates that the CP main panel is NR Connected Mode Mobility. Column 1618 indicates the CP subpanel is report configuration table. Column 1620 indicates that the parameter name is "Time To Trigger (ms)". Column 1622 indicates the parameter description: "The Time To Trigger specifies the value range used for time to trigger parameter, which concerns the time during which specific criteria for the event needs to be met in order to trigger a measurement report". Column 1624 indicates service impact="on the fly", indicating that the parameter can be changed on the fly without significant disruption to ongoing service being provided by the gNB. Column 1626 indicates that the allowable range for the parameter "TimeToTrigger" is: [(none), 0, 40, 64, 80, 100, 128, 160, 256, 320, 380, 480, 512, 640, 1024, 1280, 1280, 2560, 5120] ms, indicating that the parameter is to be one of the values in the set {0, 40, 64, 80, 100, 128, 160, 256, 320, 380, 480, 512, 640, 1024, 1280, 1280, 2560, 5120}. Column 1628 indicates that the radio manufacturer default value for the parameter "T-Evaluation" is 100 ms. Column 1630 indicates that the intended network operator 1 GPL setting value, for the radio type to which this GPL corresponds, is: 160 (for event A3) and 160 (for event A5) in units of ms.

The CACE, e.g., CACE 202, extracts information from the received GPL file represented by table 1612: parameter name "TimeToTrigger", as indicated by box 1632, and value=160, as indicated by box 1634, to obtain information 1636 indicating that the intended network operator 1 GPL value for parameter 'TimeToTrigger (ms)" for event A3 is 160.

The CACE performs an audit, e.g., in step 414, and as part of the audit, the obtained current configuration setting for parameter "TimeToTrigger" (for Event A3) of block 16, which is 100, is compared to the intended network operator 1 setting for parameter "TimeToTrigger' for event A3 of block 1636, which is 160. Thus, the audit detects a mismatch, and the CACE takes corrective action to update the configuration parameter "TimeToTrigger" for Event A3 in the radio of the gNodeB, e.g., to change the setting value from 100 to 160. In this example, the service impact indicator for the parameter "TimeToTrigger" is 'on the fly', as shown in box 1638; therefore, the CACE can update this parameter immediately without having to wait for a suitable maintenance window for the cell.

Figure 17:
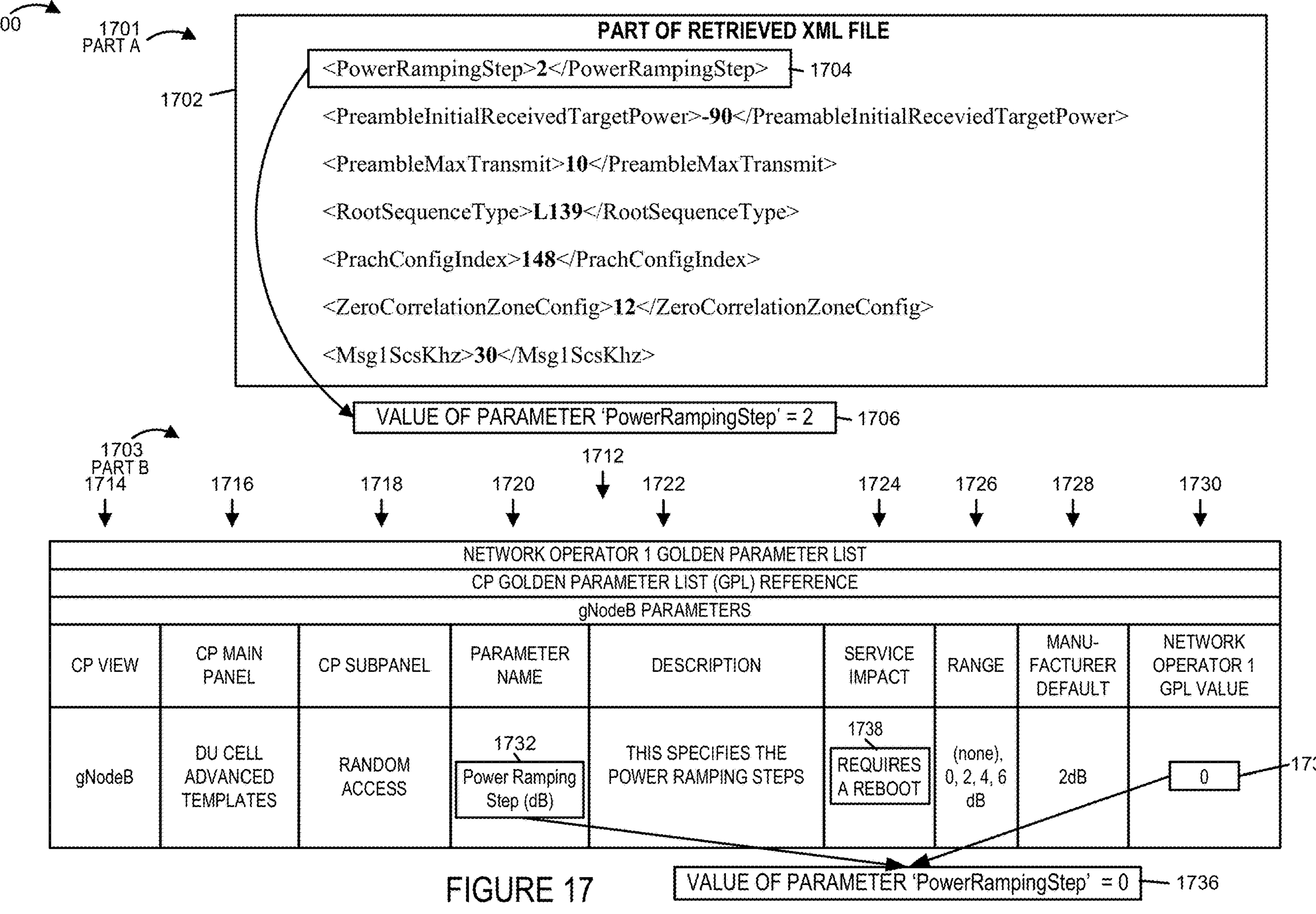
FIG. 17 illustrates an example depicting the difference in the parameter value of 'PowerRampingStep' in an XML file corresponding to particular gNB including a radio and in an exemplary mobile network operator's Golden Parameter List (GPL), said difference being detected by a CACE audit and automatically corrected (updated), e.g., during a maintenance window, said process of updating requiring a reboot, in accordance with an exemplary embodiment.

FIG. 17 illustrates an example depicting the difference in the parameter value of 'PowerRampingStep' in an XML file corresponding to particular gNB including a radio and in an exemplary mobile network operator's Golden Parameter List (GPL), said difference being detected by a CACE audit and automatically corrected (updated), e.g., during a maintenance window, said process of updating requiring a reboot, in accordance with an exemplary embodiment. Part A 1701 of drawing 1700 of FIG. 17 includes block 1702 which includes part of an exemplary retrieved XML file from an exemplary gNodeB including a radio. The exemplary retrieved XML file is, e.g., XML file 328 which includes the radio configuration settings for the radio in gNodeB 212, which is stored by gNodeB 212 in SFTP 210 and fetched by CACE 202, received by CACE 202 in step 358 and processed by CACE in step 360. The part of the retrieved XML file shown in block 1702 of FIG. 17 includes: the value of parameter "PowerRampingStep"=2, as shown in box 1704. Thus the CACE recovers information indicating that the current setting value of parameter 'PowerRampingStep" for the radio in the cell corresponding to gNB is 2, as indicated by box 1706.

Part B 1703 of drawing 1700, shown in FIG. 17 includes table 1712 which is a representation of exemplary information extracted from an exemplary network operator 1 golden parameter list (GPL), e.g., corresponding to a particular radio type, and presented in the form of control platform (CP) display format. The network operator 1 GPL is, e.g., the configuration setting file 410 obtained from the library database 230, which was requested by the CACE 202 in step 402 and received by the CACE 202 in step 412.

Column 1714 indicates that the CP view is for a gNodeB parameter. Column 1716 indicates that the CP main panel is DU cell advanced templates. Column 1718 indicates the CP subpanel is random access. Column 1720 indicates that the parameter name is "Power Ramping Step (dB)". Column 1722 indicates the parameter description: "This specifies power ramping steps". Column 1724 indicates service impact="requires a reboot", indicating that the radio and/or gNB needs to be rebooted as part of updating this parameter, and thus this parameter cannot be changed on the fly because a change on the fly could cause significant disruption to ongoing service being provided by the gNB, and if this parameter needs updating it should be updated during a convenient time when a reboot can be performed with minimal impact to operations, e.g., during a scheduled upcoming maintenance window for the cell. Column 1726 indicates that the allowable range for the parameter "Power Ramping Step" is: (none), 0, 2, 4, 6 dB, indicating that the parameter "Power Ramping Step" may be set to any of the values in the set {0 dB, 2 dB, 4 dB, 6 dB}. Column 1728 indicates that the radio manufacturer default value for the parameter "Power Ramping Step" is 2 dB. Column 1730 indicates that the intended network operator 1 GPL setting value, for the radio type to which this GPL corresponds, is: 0 (representing 0 dB).

The CACE, e.g., CACE 202, extracts information from the received GPL file represented by table 1712: parameter name "Power Ramping Step", as indicated by box 1732, and value=0 (representing 0 dB), as indicated by box 1734, to obtain information 1736 indicating that the intended network operator 1 GPL value for parameter 'T-Evaluation" is 0 dB.

The CACE performs an audit, e.g., in step 414, and as part of the audit, the obtained current configuration setting for parameter "Power Ramping Step" of block 1706, which is 2 (representing 2 dB), is compared to the intended network operator 1 setting for parameter "Power Ramping Step' of block 1736, which is 0 (representing 0 dB). Thus, the audit detects a mismatch, and the CACE takes corrective action to update the configuration parameter "Power Ramping Step" in the radio of the gNodeB, e.g., to change the setting value from 2 to 0. In this example, the service impact indicator for the parameter "Power Ramping Step" is reboot required', as shown in box 1738; therefore, the CACE will identify a suitable time in future, e.g., identify an upcoming maintenance window corresponding to the cell, wait for the identified maintenance window, and then update the parameter "Power Ramping Step" during the maintenance window, said updating process including a reboot of the radio and/or gNB.

Figure 18A:
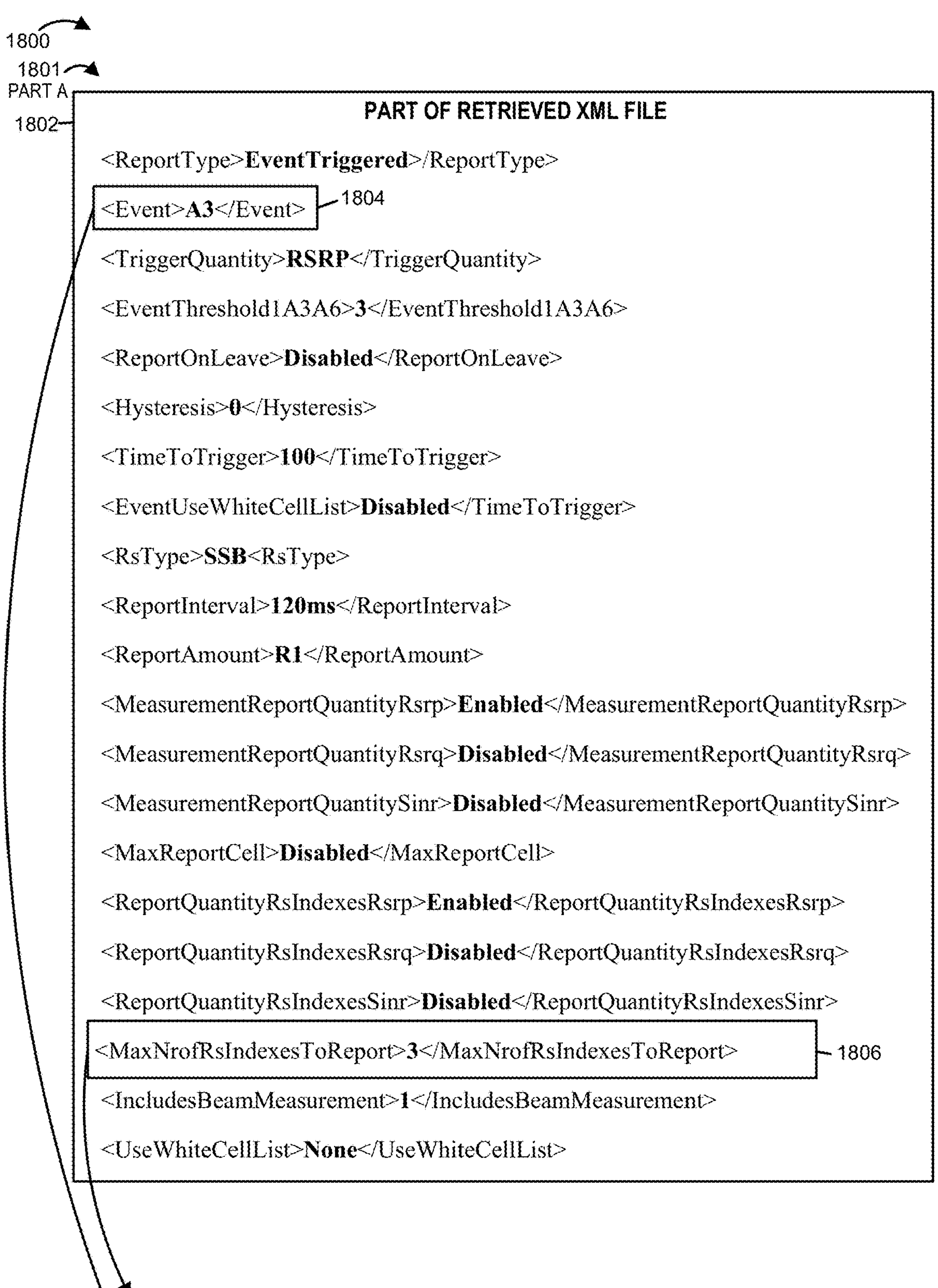
FIG. 18A illustrates a first part of an example depicting the difference in the parameter value of 'MaxNrofRsIndexesToReport' in an XML file corresponding to particular gNB including a radio and in an exemplary mobile network operator's Golden Parameter List (GPL), said difference being detected by a CACE audit and automatically corrected (updated), e.g., during a maintenance window, said process of updating requiring a reboot, in accordance with an exemplary embodiment.
Figure 18B:
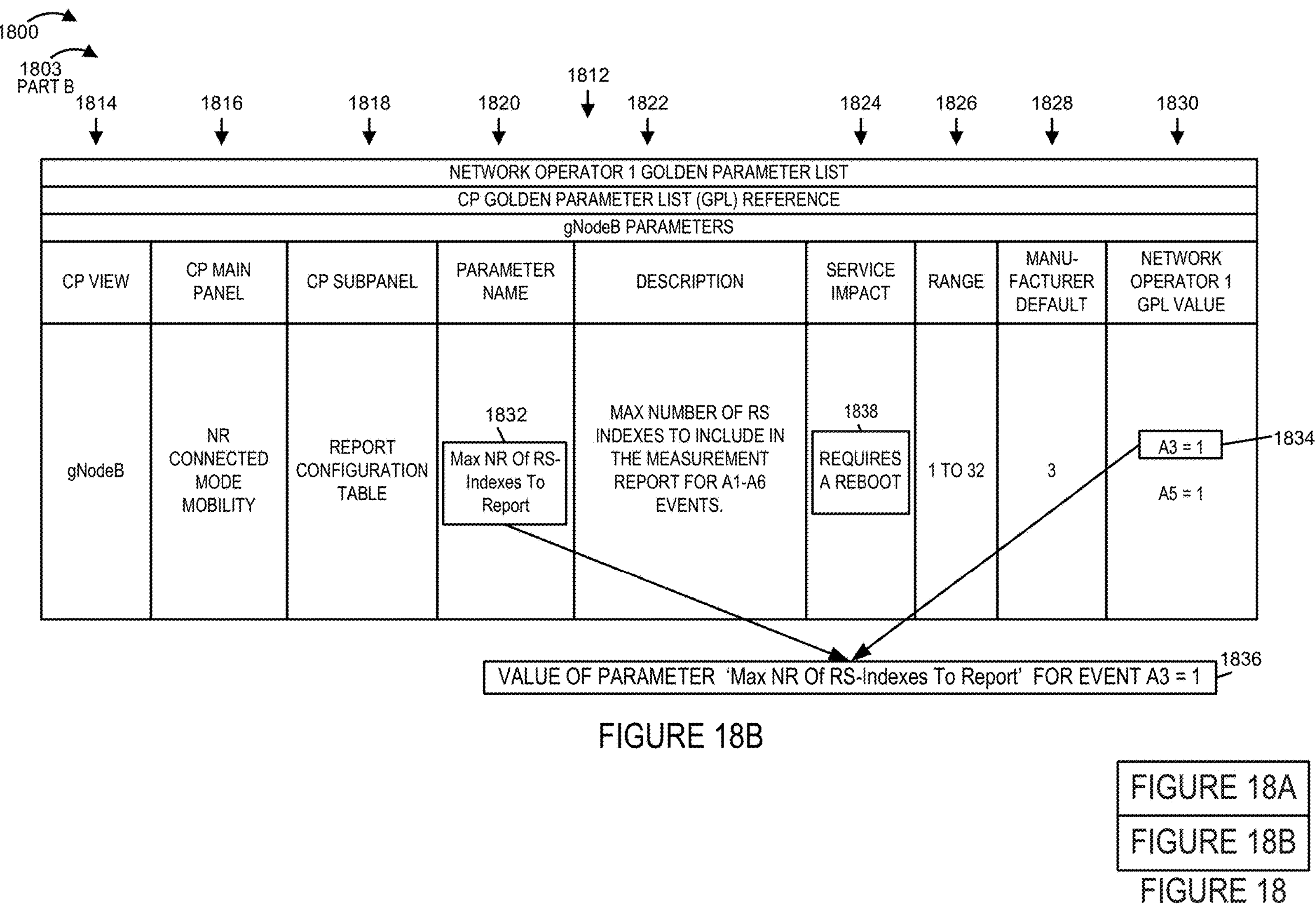
FIG. 18B illustrates a second part of an example depicting the difference in the parameter value of 'MaxNrofRsIndexesToReport' in an XML file corresponding to particular gNB including a radio and in an exemplary mobile network operator's Golden Parameter List (GPL), said difference being detected by a CACE audit and automatically corrected (updated), e.g., during a maintenance window, said process of updating requiring a reboot, in accordance with an exemplary embodiment.

FIG. 18, comprising the combination of FIG. 18A and FIG. 18B, illustrates an example depicting the difference in the parameter value of 'MaxNrofRsIndexesToReport' in an XML file corresponding to particular gNB including a radio and in an exemplary mobile network operator's Golden Parameter List (GPL), said difference being detected by a CACE audit and automatically corrected (updated), e.g., during a maintenance window, said process of updating requiring a reboot, in accordance with an exemplary embodiment.

Part A 1801 of drawing 1800 shown in FIG. 18A includes block 1802 which includes part of an exemplary retrieved XML file from an exemplary gNodeB including a radio. The exemplary retrieved XML file is, e.g., XML file 328 which includes the radio configuration settings for the radio in gNodeB 212, which is stored by gNodeB 212 in SFTP 210 and fetched by CACE 202, received by CACE 202 in step 358 and processed by CACE in step 360. The part of the retrieved XML file shown in block 1802 of FIG. 18 includes:

Event=A3, as shown in block 1804 and the value of parameter "MaxNrofRsIndexesToReport"=3, as shown in box 1806. Thus the CACE recovers information indicating that the current setting value of parameter 'MaxNrofRsIndexesToReport" for the radio in the cell corresponding to gNB for Event A3 is 3, as indicated by box 1808.

Part B 1803 of drawing 1800, shown in FIG. 18B includes table 1812 which is a representation of exemplary information extracted from an exemplary network operator 1 golden parameter list (GPL), e.g., corresponding to a particular radio type, and presented in the form of a network Control Platform (CP) display format. The network operator 1 GPL is, e.g., the configuration setting file 410 obtained from the library database 230, which was requested by the CACE 202 in step 402 and received by the CACE 202 in step 412.

Column 1814 indicates that the CP view is for a gNodeB parameter. Column 1616 indicates that the CP main panel is NR Connected Mode Mobility. Column 1818 indicates the CP subpanel is report configuration table. Column 1820 indicates that the parameter name is "Max NR Of RS-Indexes To Report". Column 1822 indicates the parameter description: "Max number of RS indexes to include in the measurement report for A1-A6 events". Column 1824 indicates service impact="requires a reboot", indicating that the radio and/or gNB needs to be rebooted as part of updating this parameter, and thus this parameter cannot be changed on the fly because a change on the fly could cause significant disruption to ongoing service being provided by the gNB, and if this parameter needs updating it should be updated during a convenient time when a reboot can be performed with minimal impact to operations, e.g., during a scheduled upcoming maintenance window for the cell. Column 1826 indicates that the allowable range for the parameter "Max NR Of RS-Indexes To Report" is: 1 to 32. Column 1828 indicates that the radio manufacturer default value for the parameter "Max NR Of RS-Indexes To Report" is 3. Column 1830 indicates that the intended network operator 1 GPL setting value, for the radio type to which this GPL corresponds, is: 1 (for event A3) and 1 (for event A5).

The CACE, e.g., CACE 202, extracts information from the received GPL file represented by table 1812: parameter name "Max NR of RS-Indexes To Report", as indicated by box 1832, and value=1 (for event A3), as indicated by box 1834, to obtain information 1836 indicating that the intended network operator 1 GPL value for parameter 'Max (maximum) NR (number) of RS (Reference Signals)—Indexes to Report" for event A3 is 1.

The CACE performs an audit, e.g., in step 414, and as part of the audit, the obtained current configuration setting for parameter "Max NR of RS-Indexes to Report" (for event A3) of block 1836, which is 3, is compared to the intended network operator 1 setting for parameter "Max NR of RS-Indexes to Report' for event A3 of block 1836, which is 1. Thus, the audit detects a mismatch, and the CACE takes corrective action to update the configuration parameter "Max NR of RS-Indexes to Report" for Event A3 in the radio of the gNodeB, e.g., to change the setting value from 3 to 1. In this example, the service impact indicator for the parameter "Max Nr of RS-Indexes to Report" is "reboot required", as shown in box 1838; therefore, the CACE will identify a suitable time in future, e.g., identify an upcoming maintenance window corresponding to the cell, wait for the identified maintenance window, and then update the parameter "Max Nr of RS-Indexes to Report" during the maintenance window, said updating process including a reboot of the radio and/or gNB.

FIG. 19 is an exemplary CACE audit results summary chart 1900 (for an exemplary gNB in network operator 1's network) identifying the radio configuration parameters which require updating. First column 1902 includes a list of the identified parameters which need updating. Second column 1904 lists a parameter description for each of the identified parameters. Third column 1906 includes a service impact classification for each of the identified parameters. Fourth column 1908 includes parameter values (for each of the identified parameters) which are currently loaded into the network operator 1's network gNB (which is being audited) said gNB including a radio of radio type 1. Fifth column 1910 includes network operator 1 radio type 1 customized golden parameter list (GPL) values for each of the identified parameters. First row 1912 includes column header information.

Second row 1914 indicates that the parameter "T-evaluation", which indicates the duration for evaluating criteria to enter mobility states, has been classified as an "on the fly" type of parameter, which can be updated immediately without significant impact to ongoing service. Second row 1914 further indicates the value for the "T-Evaluation" parameter which is currently loaded in the network operator 1's gNB, which is being audited, is S120 (representing 120 seconds) while the network operator 1 radio type 1 GPL value for the parameter "T-Evaluation" is S180 (representing 180). Therefore, the parameter "T-evaluation" is to be updated, e.g., immediately following the audit, in the gNB to install the intended value of S180.

Third row 1916 indicates that the parameter "Time To Trigger" (for event A3), which indicates the time during which specific criteria for an A3 event needs to be met in order to trigger a measurement report, has been classified as an "on the fly" type of parameter, which can be updated immediately without significant impact to ongoing service. Third row 1916 further indicates the value for the "Time To Trigger" (for event A3) parameter which is currently loaded in the network operator 1's gNB, which is being audited, is 100 ms, while the network operator 1 radio type 1 GPL value for the parameter "Time To Trigger" for event A3 is 160 ms. Therefore, the parameter "Time To Trigger" (for event A3) is to updated, e.g., immediately following the audit, in the gNB to install the intended value of 160 ms.

Fourth row 1918 indicates that the parameter "Power Ramping Step", which indicates the power ramping step size, has been classified as an "reboot required" type of parameter, which requires a reboot as part of a parameter updating process, can not be updated on the fly without significant impact to service, and is it be updated, when needed, during a convenient time, e.g., during a upcoming scheduled maintenance window, in which a reboot can be performed. Fourth row 1918 further indicates the value for the "Power Ramping Step" parameter which is currently loaded in the network operator 1's gNB, which is being audited, is 2 dB, while the network operator 1 radio type 1 GPL value for the parameter "Power Ramping Step" is 0 dB. Therefore, the parameter "Power Ramping Step" is to be updated, e.g., during an identified scheduled upcoming maintenance window for the cell, in the gNB to install the intended value of 0 dB.

Fifth 1920 indicates that the parameter "Maximum Number of Reference Signal (RS) Indexes to Report" (for event A3), which indicates the maximum number of RS indexes to include in the measurement report for an A3 event, has been classified as an "reboot required" type of parameter, which requires a reboot as part of a parameter updating process, can not be updated on the fly without significant impact to service, and is it be updated, when needed, during a convenient time, e.g., during a upcoming scheduled maintenance window, in which a reboot can be performed. Fifth row 1920 further indicates the value for the "Maximum Number of Reference Signal Indexes to Report" (for event A3) parameter which is currently loaded in the network operator 1's gNB, which is being audited, is 3 while the network operator 1 radio type 1 GPL value for the parameter "Maximum Number of Reference Signal Indexes to Report" for event A3 is 1. Therefore, the parameter "Maximum Number of Reference Signal Indexes to Report" (for event A3) is to be updated, e.g., during an identified scheduled upcoming maintenance window for the cell, in the gNB to install the intended value of 1.

Various aspects and/or features of some embodiments of the present invention are further discussed below. A Configuration Auditor and Configuration Enforcer (CACE) function, in accordance with the present invention, runs audits for cells, e.g., for each cell, in a network and finds any discrepancies in the configurations, e.g., radio configurations. In some embodiments, the CACE is implemented as a separate function which complements an OSS. In some other embodiments, the CACE function is implemented as a part of an operations support system (OSS).

If one or more discrepancies are found for an audited cell, the CACE function will find the library of Configuration Management (CM) for the given radio(s), corresponding to the audited cell with the problem, and determine the appropriate time and/or maintenance window for updates and then apply the updates to the radio(s) at the appropriate time and/or during any appropriate maintenance window. Some radio configuration parameters may be updated immediately, e.g., on the fly, while the cell continues to operate and provide service to UEs. Other radio configuration parameters may require a reboot of the radio and/or communication device, e.g., base station including the radio, as part of the updating process and the updated is performed during a maintenance window for the cell.

In a first step, in accordance with an exemplary embodiment, the CACE fetches the configuration settings of a radio, e.g., sending a request (e.g., including a cell ID and a S/N (radio S/N and/or base station S/N)) for radio configuration information, and obtaining, in response to the request, the current actual configuration settings of the radio. Different approaches can be used for communicating the response to the CACE. In one approach, the communications device, e.g., gNB, including the radio, sends a JSON including the requested radio configuration setting information to the CACE. In another approach, the communications device, e.g., gNB including the radio, generates and loads a file, e.g., an XML file, including the requested radio configuration setting information onto a server, e.g., a SFTP server, and the CACE subsequently retrieves the file from the server and then recovers the requested radio configuration setting information from the file.

In a second step, in accordance with an exemplary embodiment, the CACE performs an audit, e.g., the CACE compares the obtained current actual configuration settings of the radio with the desired (intended) configuration settings which are in a standard library (e.g., a network service provider's library of golden parameters) to identify any discrepancies, e.g., radio configuration setting mismatches. Different files of golden parameters in the library correspond to different radio types. The golden parameter file corresponding to the radio type of the radio being audited is selected from the library and used in the audit.

If discrepancies are found, in a third step in accordance with an exemplary embodiment, the CACE generates one or more configuration updates to be sent to the radio with the identified configuration mismatch. In a fourth step the CACE determines when each of one or more updates should be communicated to the radio, e.g., immediately on the fly or during a particular maintenance window and performs each of the updates at the appropriate time. In some embodiments, following the completion of an audit and the automatic performing of configuration updates, the audit is repeated, e.g., to verify that each of the identified discrepancies has been addressed and very there are not any outstanding issues.

Numbered List of Exemplary Method Embodiments

Method Embodiment 1. A method of controlling cell configurations, the method comprising: retrieving (604 or 301) (e.g., at a Configuration Auditor and Configuration Enforcer (CACE)) first cell radio configuration information indicating radio configuration settings of a first radio in the first cell, said first radio being of a first radio type, said first cell radio configuration information indicating a current radio configuration of the first cell; accessing (612 or 401) stored first type radio configuration information, said stored first type radio configuration information specifying radio configuration settings to be used for radios of the first type; identifying (616 or 414) (e.g., by performing an audit) radio settings in the retrieved first cell radio configuration information which differ from the accessed stored first type radio configuration information; and taking (621 or 505) action to automatically correct one or more identified radio settings which differ from the corresponding setting indicated in the accessed stored first type radio configuration information.

Method Embodiment 2. The method of Method Embodiment 1, wherein retrieving (604 or 301) first cell radio configuration information includes: sending (606 or 302) a message requesting first cell radio configuration information (e.g., send a message with cell ID and radio serial number to an OSS, which then sends (310) a request to the gNodeB (cell 1), identified in the message, to provide the requested first cell radio configuration information); and receiving (608 or 322) first cell radio configuration information (e.g., in a JSON object listing radio configuration settings in the form of parameters which can be set as part of configuring the first radio) from a wireless communication device (e.g., a gNodeB, which corresponds to the first cell and which includes the first radio identified in the message requesting first cell radio configuration information).

Method Embodiment 3. The method of Method Embodiment 1, wherein retrieving (604 or 301) first cell radio configuration information includes: sending (606 or 302) a message requesting first cell radio configuration information (e.g., send a message with cell ID and radio serial number to an OSS, which then sends (310) a request to the gNodeB (cell 1), identified in message, to provide the requested first cell radio configuration information); and receiving (610 or 358) first cell radio configuration information from a file store (e.g., a secure shell file transfer protocol (SFTP) server) into which the first cell radio configuration information has been loaded (e.g., receiving the first cell radio configuration information from the SFTP server into which the requested first cell radio configuration information was loaded by the cell (gNodeB) including the identified first radio, said receipt of first cell radio configuration information being in the form of a fetched set of information or a file returned by the SFTP server in response to a file fetch request made by the CACE following sending of the message requesting first cell radio configuration information).

Method Embodiment 4. The method of Method Embodiment 1, further comprising: separating (618 or 504) identified radio settings in the retrieved first cell radio configuration information which differ from the accessed stored first type radio configuration information into: i) identified settings, which if changed while service is being provided by the first cell, would have a disruptive impact on an ongoing service (e.g., settings which are not allowed to be changed on the fly, e.g., because cause termination of an ongoing session or delay communications which are ongoing due to a setting reset) (e.g., a live service or ongoing communications session supported by the first cell) (and e.g., settings which if changed require a reboot of the cell and/or cell radio) and ii) identified settings, which if changed while service is being provided by the first cell, will not have a disruptive impact on an ongoing service.

Method Embodiment 4A. The method of Method Embodiment 4, wherein settings which can be changed on the fly are settings which can be changed without having a disruptive impact on ongoing service.

Method Embodiment 4B. The method of Method Embodiment 4, wherein setting changes which require a reboot of the cell or radio to which the change in settings is made are disruptive setting changes which would have a disruptive impact on ongoing service.

Method Embodiment 5. The method of Method Embodiment 4, wherein taking (621 or 505) an action to automatically correct one or more identified radio settings which differ from the corresponding setting indicated in the accessed stored first type radio configuration information includes: taking (622 or (508, 512, 536, 538)) an action to automatically correct one or more identified radio settings which differ from the corresponding setting indicated in the accessed stored first type radio configuration information which, if changed while service is being provided by the first cell, will not have a disruptive impact on ongoing service including: pushing (624 or 512) an immediate radio parameter setting update (e.g., immediately without waiting for a first cell service update window) to update one or more identified radio settings to match corresponding radio settings indicated in the stored first type radio configuration information.

Method Embodiment 6. The method of Method Embodiment 5, wherein taking (621 or 505) an action to automatically correct one or more identified radio settings which differ from the corresponding setting indicated in the accessed stored first type radio configuration information includes: taking (626 or (510, 540, 550, 552, 553, 554, 578, 580)) an action to automatically correct one or more identified radio settings which differ from the corresponding setting indicated in the accessed stored first type radio configuration information, which, if changed while service is being provided by the first cell, would have a disruptive impact on ongoing service including: waiting (628 or 553) for a first cell maintenance window before updating identified radio settings for the first cell which if changed while service is being provided by the first cell would have a disruptive impact on an ongoing service at the first cell; and pushing (512 or 554), during a first cell maintenance window following identification radio settings in the retrieved first cell radio configuration information which differ from the accessed stored first type radio configuration information, a radio parameter setting update to update one or more identified radio settings which if changed during a service period of the first cell would have a disruptive impact on service provided by the first cell, to match corresponding radio settings indicated in the stored first type radio configuration information.

Method Embodiment 7. The method of Method Embodiment 3, wherein accessing (612 or 401) stored first type radio configuration information includes (614 or 412) accessing radio type records including intended radio configurations for a communications network in which the first cell is located, said intended radio configuration information indicating radio settings to be used for radios in the communications network based on radio type, said first radio type being one of a plurality of different types of radios for which intended radio setting configuration information is stored for the communications network in a storage device accessible to a Configuration Auditor and Configuration Enforcer (CACE).

Method Embodiment 7a. The method of Method Embodiment 7, wherein said step of retrieving first cell radio configuration information indicating radio configuration settings of a first radio in the first cell is performed by the CACE.

Method Embodiment 7A. The method of Method Embodiment 7 wherein said storage device accessible to the CACE is part of the CACE or is accessible by a network connection that is present between the CACE and storage device.

Method Embodiment 7B. The method of Method Embodiment 1, wherein said method is performed by a Configuration Auditor and Configuration Enforcer (CACE).

Method Embodiment 7C. The method of Method Embodiment 7B, wherein said CACE is a separate entity from an Operation Support System (OSS) to which the CACE is coupled.

Method Embodiment 7D. The method of Method Embodiment 7B, wherein said CACE is part of an Operation Support System (OSS).

Numbered List of Exemplary Apparatus Embodiments

Apparatus Embodiment 1. A Configuration Auditor and Configuration Enforcer (CACE) device (202 or 900) comprising: memory (912); and a processor (902) configured to operate the CACE device to: retrieve (604 or 301) first cell radio configuration information indicating radio configuration settings of a first radio in the first cell, said first radio being of a first radio type, said first cell radio configuration information indicating a current radio configuration of the first cell; access (612 or 401) stored first type radio configuration information, said stored first type radio configuration information specifying radio configuration settings to be used for radios of the first type; identify (616 or 414) (e.g., by performing an audit) radio settings in the retrieved first cell radio configuration information which differ from the accessed stored first type radio configuration information; and take (621 or 505) action to automatically correct one or more identified radio settings which differ from the corresponding setting indicated in the accessed stored first type radio configuration information.

Apparatus Embodiment 2. The CACE device (202 or 900) of Apparatus Embodiment 1, wherein said CACE device further comprises: a receiver (906); and a transmitter (908); and wherein said processor (902) is configured to: operate the transmitter (908) to send (606 or 302) a message requesting first cell radio configuration information (e.g., send a message with cell ID and radio serial number to an OSS, which then sends (310) a request to the gNodeB (cell 1), identified in the message, to provide the requested first cell radio configuration information); and operate the receiver (906) to receive (608 or 322) first cell radio configuration information (e.g., in a JSON object listing radio configuration settings in the form of parameters which can be set as part of configuring the first radio) from a wireless communication device (e.g., a gNodeB, which corresponds to the first cell and which includes the first radio identified in the message requesting first cell radio configuration information), as part of being configured to operate the CACE to retrieve (604 or 301) first cell radio configuration information.

Apparatus Embodiment 3. The CACE device (202 or 900) of Apparatus Embodiment 1, wherein said CACE device further comprises: a receiver (906); and a transmitter (908); and wherein said processor (902) is configured to: operate the transmitter (908) to send (606 or 302) a message requesting first cell radio configuration information (e.g., send a message with cell ID and radio serial number to an OSS, which then sends (310) a request to the gNodeB (cell 1), identified in message, to provide the requested first cell radio configuration information); and operate the receiver (906) to receive (610 or 358) first cell radio configuration information from a file store (e.g., a secure shell file transfer protocol (SFTP) server) into which the first cell radio configuration information has been loaded (e.g., receiving the first cell radio configuration information from the SFTP server into which the requested first cell radio configuration information was loaded by the cell (gNodeB) including the identified first radio, said receipt of first cell radio configuration information being in the form of a fetched set of information or a file returned by the SFTP server in response to a file fetch request made by the CACE following sending of the message requesting first cell radio configuration information), as part of being configured to operate the CACE device to retrieve (604 or 301) first cell radio configuration information.

Apparatus Embodiment 4. The CACE device (202 or 900) of Apparatus Embodiment 1, wherein said processor (902) is further configured to operate the CACE device to: separate (618 or 504) identified radio settings in the retrieved first cell radio configuration information which differ from the accessed stored first type radio configuration information into: i) identified settings, which if changed while service is being provided by the first cell, would have a disruptive impact on an ongoing service (e.g., settings which are not allowed to be changed on the fly, e.g., because cause termination of an ongoing session or delay communications which are ongoing due to a setting reset) (e.g., a live service or ongoing communications session supported by the first cell) (and e.g., settings which if changed require a reboot of the cell and/or cell radio) and ii) identified settings, which if changed while service is being provided by the first cell, will not have a disruptive impact on an ongoing service.

Apparatus Embodiment 4A. The CACE device (202 or 900) of Apparatus Embodiment 4, wherein settings which can be changed on the fly are settings which can be changed without having a disruptive impact on ongoing service.

Apparatus Embodiment 4B. The CACE device (202 or 900) of Apparatus Embodiment 4, wherein setting changes which require a reboot of the cell or radio to which the change in settings is made are disruptive setting changes which would have a disruptive impact on ongoing service.

Apparatus Embodiment 5. The CACE device (202 or 900) of Apparatus Embodiment 4, wherein taking (621 or 505) an action to automatically correct one or more identified radio settings which differ from the corresponding setting indicated in the accessed stored first type radio configuration information includes: taking (622 or (508, 512, 536, 538)) an action to automatically correct one or more identified radio settings which differ from the corresponding setting indicated in the accessed stored first type radio configuration information which, if changed while service is being provided by the first cell, will not have a disruptive impact on ongoing service including: pushing (624 or 512) an immediate radio parameter setting update (e.g., immediately without waiting for a first cell service update window) to update one or more identified radio settings to match corresponding radio settings indicated in the stored first type radio configuration information.

Apparatus Embodiment 6. The CACE device (202 or 900) of Apparatus Embodiment 5, wherein taking (621 or 505) an action to automatically correct one or more identified radio settings which differ from the corresponding setting indicated in the accessed stored first type radio configuration information includes: taking (626 or (510, 540, 550, 552, 553, 554, 578, 580)) an action to automatically correct one or more identified radio settings which differ from the corresponding setting indicated in the accessed stored first type radio configuration information, which, if changed while service is being provided by the first cell, would have a disruptive impact on ongoing service including: waiting (628 or 553) for a first cell maintenance window before updating identified radio settings for the first cell which if changed while service is being provided by the first cell would have a disruptive impact on an ongoing service at the first cell; and pushing (512 or 554), during a first cell maintenance window following identification radio settings in the retrieved first cell radio configuration information which differ from the accessed stored first type radio configuration information, a radio parameter setting update to update one or more identified radio settings which if changed during a service period of the first cell would have a disruptive impact on service provided by the first cell, to match corresponding radio settings indicated in the stored first type radio configuration information.

Apparatus Embodiment 7. The CACE device (202 or 900) of Apparatus Embodiment 3, wherein said processor (902) is configured, as part of being configured to operate the CACE device to access (612 or 401) stored first type radio configuration information, to operate the CACE device to access (614 or 412) radio type records including intended radio configurations for a communications network in which the first cell is located, said intended radio configuration information indicating radio settings to be used for radios in the communications network based on radio type, said first radio type being one of a plurality of different types of radios for which intended radio setting configuration information is stored for the communications network in a storage device (230) accessible to the processor (902) of the Configuration Auditor and Configuration Enforcer (CACE) device.

Apparatus Embodiment 7A. The CACE device (202 or 900) of Apparatus Embodiment 7 wherein said storage device (230) accessible to the processor (902) of the CACE device is part of the CACE or is accessible by a network connection that is present between the CACE device and storage device (230).

Apparatus Embodiment 7C. The CACE device (202 or 900) of Apparatus Embodiment 7B, wherein said CACE device (202 or 900) is a separate entity from an Operation Support System (OSS) (232) to which the CACE device is coupled.

Apparatus Embodiment 7D. The CACE device (202 or 900) of Apparatus Embodiment 7B, wherein said CACE device (202 or 900) is part of an Operation Support System (OSS) (232).

Numbered List of Exemplary Non-Transitory Computer Readable Medium Embodiments

Non-Transitory Computer Readable Medium Embodiment 1. A Non-Transitory Computer Readable Medium (912) including machine executable instructions which when executed by a process (902) of a Configuration Auditor and Configuration Auditor (CACE) device (202 or 900) cause the CACE device (202 or 900) to perform the steps of: retrieving (604 or 301) (e.g., at a Configuration Auditor and Configuration Enforcer (CACE)) first cell radio configuration information indicating radio configuration settings of a first radio in the first cell, said first radio being of a first radio type, said first cell radio configuration information indicating a current radio configuration of the first cell; accessing (612 or 401) stored first type radio configuration information, said stored first type radio configuration information specifying radio configuration settings to be used for radios of the first type; identifying (616 or 414) (e.g., by performing an audit) radio settings in the retrieved first cell radio configuration information which differ from the accessed stored first type radio configuration information; and taking (621 or 505) action to automatically correct one or more identified radio settings which differ from the corresponding setting indicated in the accessed stored first type radio configuration information.

In various embodiments the method shown in the signaling diagrams of FIGS. 3 to 5 and/or flow chart of FIG. 6 are performed for one, multiple or all base stations, access points, or other communications devices including a radio that are in a network. Various embodiments are directed to apparatus, e.g., a Configuration Auditor and Configuration Enforcer (CACE) device, an operations support system (OSS) device, a secure shell file transfer protocol (SFTP) server, core network nodes, base stations, UEs, access points, a device including a AMF, a device including a UDM, a device including a SMF, a device including a PCF, a device including a UPF, a server, a device including a N3IWF, a device including a TNGF, base stations, e.g. sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a Configuration Auditor and Configuration Enforcer (CACE) device, an operations support system (OSS) device, a secure shell file transfer protocol (SFTP) server, core network nodes, base stations, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware. Devices can and sometimes are implemented as a set of separate elements or processors which work together to implement the functions attributed to a device. Cloud based processing systems can are used to implement one or more functions of a device in some embodiments.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a Configuration Auditor and Configuration Enforcer (CACE) device, an operations support system (OSS) device, a secure shell file transfer protocol (SFTP) server, a core network node, a base station, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., a Configuration Auditor and Configuration Enforcer (CACE) device, an operations support system (OSS) device, a secure shell file transfer protocol (SFTP) server, a core network node, a base station, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g., a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a Configuration Auditor and Configuration Enforcer (CACE) device, an operations support system (OSS) device, a secure shell file transfer protocol (SFTP) server, a core network node, a base station, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as a Configuration Auditor and Configuration Enforcer (CACE) device, an operations support system (OSS) device, a secure shell file transfer protocol (SFTP) server, a core network node, a base station, a UE, an access point, a device including a AMF, a device including a UDM, a device including a SMF, a device including a PCF, a device including a UPF, a server, a device including a N3IWF, a device including a TNGF, base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a Configuration Auditor and Configuration Enforcer (CACE) device, an operations support system (OSS) device, a secure shell file transfer protocol (SFTP)

server, a core network node, a base station, a UE, an access point, a device including a AMF, a device including a UDM, a device including a SMF, a device including a PCF, a device including a UPF, a server, a device including a N3IWF, a device including a TNGF, a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., a UE, an access point, a device including a AMF, a device including a UDM, a device including a SMF, a device including a PCF, a device including a UPF, a server, a device including a N3IWF, a device including a TNGF, an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of controlling one or more radio configurations, the method comprising:

retrieving, at a configuration control device, first radio configuration information indicating radio configuration settings of a first radio used to provide communications services to other devices, said first radio being a radio of a first type, said first radio configuration information indicating a current radio configuration of the first radio;

accessing stored first type radio configuration information, said stored first type radio configuration information specifying radio configuration settings to be used for radios of the first type;

identifying radio settings in the retrieved first radio configuration information which differ from the accessed stored first type radio configuration information, said identified radio settings which differ from the accessed stored first type radio configuration information including a setting, which if changed while the first radio is being used to provide service to other devices, would have a disruptive impact on ongoing service; and taking action to automatically correct one or more identified radio settings in the retrieved first radio configuration information which differ from the accessed stored first type radio configuration information, said taking an action including:

identifying an upcoming maintenance window at the first radio which is long enough to reconfigure the first radio with a radio parameter setting update to change said setting, which if changed while the first radio is being used to provide service to other devices, would have a disruptive impact on ongoing service; and pushing, during the identified upcoming maintenance window, the radio parameter setting update to change said setting, which if changed while the first radio is being used to provide service to other devices, would have a disruptive impact on ongoing service.

2. The method of claim 1, wherein retrieving first radio configuration information includes:

sending a message requesting first radio configuration information; and receiving first radio configuration information from a file store into which the first radio configuration information has been loaded.

3. The method of claim 2, wherein accessing stored first type radio configuration information includes accessing radio type records including intended radio configuration information for a communications network in which the first radio is located, said intended radio configuration information indicating radio settings to be used for radios in the communications network based on radio type, said first radio type being one of a plurality of different types of radios for which intended radio setting configuration information is stored for the communications network in a storage device accessible to the configuration control device, said configuration control device being a Configuration Auditor and Configuration Enforcer (CACE), said CACE being separate from a first base station in which the first radio is located and user equipments (UEs).

4. The method of claim 3, wherein said step of retrieving first radio configuration information indicating radio configuration settings of the first radio is performed by the CACE.

5. The method of claim 1, further comprising:

separating identified radio settings in the retrieved first radio configuration information which differ from the accessed stored first type radio configuration information into: i) identified settings, which if changed at the first radio, while service is being provided, would have a disruptive impact on an ongoing service and ii) identified settings, which if changed at the first radio while service is being provided, will not have a disruptive impact on an ongoing service provided.

6. The method of claim 5, wherein taking an action to automatically correct one or more identified radio settings in the retrieved first radio configuration information which differ from the accessed stored first type radio configuration information includes:

taking an action to automatically correct one or more identified first radio settings which differ from the corresponding one or more settings indicated in the accessed stored first type radio configuration information which, if changed while service is being provided, will not have a disruptive impact on ongoing service provided including:

pushing an immediate radio parameter setting update to change one or more identified radio settings in the first radio, as part of an update, to match corresponding radio settings indicated in the stored first type radio configuration information.

7. The method of claim 6, wherein the first radio is a first base station radio of a first base station of a first cell.

8. The method of claim 5, wherein settings which can be changed on the fly are settings which can be changed without having a disruptive impact on ongoing service provided using the first radio.

9. The method of claim 5, wherein setting changes which require a reboot of a cell including the first radio or a reboot of the first radio to which the change in settings changes is made are disruptive setting changes which would have a disruptive impact on ongoing service provided.

10. The method of claim 1, wherein said method is performed by a Configuration Auditor and Configuration Enforcer (CACE), said CACE being a separate device from a first base station, which includes the first radio, and user equipments (UEs), in a communications network which includes said CACE.

11. The method of claim 10, wherein retrieving first radio configuration information includes:

sending a message requesting first radio configuration information to a device including the first radio;

wherein said CACE is a separate entity from an Operation Support System (OSS) to which the CACE is coupled; and wherein sending a message requesting first radio configuration information includes operating the CACE to send a message to the OSS requesting first radio configuration information, said message including a cell ID corresponding to a first cell and a radio serial number corresponding to the first radio.

12. The method of claim 1, wherein retrieving first radio configuration information includes:

sending a message requesting first radio configuration information to a device including the first radio; and receiving first radio configuration information.

13. A Configuration Auditor and Configuration Enforcer (CACE) device comprising:

memory; and a processor configured to operate the CACE device to:

retrieve, at a configuration control device, first radio configuration information indicating radio configuration settings of a first radio used to provide communications services to other devices, said first radio being of a first radio of a first type, said first radio configuration information indicating a current radio configuration of the first radio;

access stored first type radio configuration information, said stored first type radio configuration information specifying radio configuration settings to be used for radios of the first type;

identify radio settings in the retrieved first radio configuration information which differ from the accessed stored first type radio configuration information, said identified radio settings which differ from the accessed stored first type radio configuration information including a setting, which if changed while the first radio is being used to provide service to other devices, would have a disruptive impact on ongoing service; and take an action to automatically correct one or more identified first radio settings in the retrieved first radio configuration information which differ from the accessed stored first type radio configuration information, said action including:

identifying an upcoming maintenance window at the first radio which is long enough to reconfigure the first radio with a radio parameter setting update to change said setting, which if changed while the first radio is being used to provide service to other devices, would have a disruptive impact on ongoing service; and pushing, during the identified upcoming maintenance window the radio parameter setting update to change said setting, which if changed while the first radio is being used to provide service to other devices, would have a disruptive impact on ongoing service.

14. The CACE device of claim 13, wherein said CACE device further comprises:

a receiver; and a transmitter; and wherein said processor is further configured to:

operate the transmitter to send a message requesting first radio configuration information; and operate the receiver to receive first radio configuration information from a file store into which the first radio configuration information has been loaded, as part of being configured to operate the CACE device to retrieve first radio configuration information.

15. The CACE device of claim 14, wherein said processor is configured, as part of being configured to operate the CACE device to access stored first type radio configuration information, to operate the CACE device to access radio type records including intended radio configuration information for a communications network in which a first cell in which the first radio is located, said intended radio configuration information indicating radio settings to be used for radios in the communications network based on radio type, said first radio type being one of a plurality of different types of radios for which intended radio setting configuration information is stored for the communications network in a storage device accessible to the processor of the Configuration Auditor and Configuration Enforcer (CACE) device.

16. The CACE device of claim 15, wherein said storage device accessible to the processor of the CACE device is part of the CACE device or is accessible by a network connection that is present between the CACE device and said storage device.

17. The CACE device of claim 13, wherein said processor is further configured to operate the CACE device to:

separate identified radio settings in the retrieved first radio configuration information which differ from the accessed stored first type radio configuration information into: i) identified settings, which if changed at the first radio while service is being provided, would have a disruptive impact on an ongoing service provided and ii) identified settings, which if changed at the first radio while service is being provided, will not have a disruptive impact on an ongoing service provided.

18. The CACE device of claim 17, wherein taking an action to automatically correct one or more identified first radio settings in the retrieved first radio configuration information which differ from the accessed stored first type radio configuration information includes:

taking an action to automatically correct one or more identified radio settings which differ from the corresponding one or more settings indicated in the accessed stored first type radio configuration information which, if changed while service is being provided will not have a disruptive impact on ongoing service provided by:

pushing an immediate radio parameter setting update to change one or more identified radio settings in the first radio to match corresponding radio settings indicated in the stored first type radio configuration information.

19. The CACE device of claim 18, wherein the first radio is a first base station radio of a first base station of a first cell.

20. The CACE device of claim 13, wherein said CACE device further comprises:

a receiver; and a transmitter; and wherein said processor is configured to:

operate the transmitter to send a message requesting first radio configuration information; and operate the receiver to receive first radio configuration information from a wireless communications device, as part of being configured to operate the CACE to retrieve first radio configuration information.

* * * * *